US009256816B2

(12) United States Patent
Miyanaga

(10) Patent No.: US 9,256,816 B2
(45) Date of Patent: Feb. 9, 2016

(54) COLOR CONVERTING DEVICE AND METHOD PERFORMING COLOR CONVERSIONS USING A FIRST COLOR CONVERSION TABLE WHEN FIRST COLOR VALUE SATISFIES A PRESET CONDITION AND USING A SECOND COLOR CONVERSION TABLE WHEN FIRST COLOR VALUE DOES NOT SATISFY THE PRESET CONDITION

(71) Applicant: KYOCERA Document Solutions Inc., Osaka (JP)

(72) Inventor: Yuka Miyanaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/523,126

(22) Filed: Oct. 24, 2014

(65) Prior Publication Data
US 2015/0116738 A1    Apr. 30, 2015

(30) Foreign Application Priority Data
Oct. 25, 2012 (JP) .................................. 2013-222192

(51) Int. Cl.
*G06K 1/00* (2006.01)
*G06K 15/02* (2006.01)
*H04N 1/60* (2006.01)
*H04N 1/56* (2006.01)

(52) U.S. Cl.
CPC .............. *G06K 15/1878* (2013.01); *H04N 1/56* (2013.01); *H04N 1/60* (2013.01); *H04N 1/6008* (2013.01); *H04N 1/6025* (2013.01); *H04N 2201/0094* (2013.01)

(58) Field of Classification Search
None
See application file for complete search history.

(56) References Cited

U.S. PATENT DOCUMENTS

| 5,631,749 | A  | * | 5/1997 | Ueda ............................. 358/520 |
| 7,936,481 | B2 | * | 5/2011 | Nakatani et al. ............... 358/3.1 |
| 8,244,004 | B2 | * | 8/2012 | Free ............................. 382/118 |
| 8,767,266 | B2 | * | 7/2014 | Nagai .......................... 358/3.23 |

FOREIGN PATENT DOCUMENTS

JP    2008-072477 A    3/2008

* cited by examiner

*Primary Examiner* — Steven Kau
(74) *Attorney, Agent, or Firm* — Studebaker & Brackett PC

(57) ABSTRACT

An image forming apparatus is a color converting device for converting a first color value acquired from printing data to a second color value. A color position calculating section calculates a hue plane and a chroma of the first color value. A color value converting section converts the first color value to the second color value using a K-monochrome color conversion table in which achromatic colors are set as monochromatic colors when the chroma of the first color value calculated by the color position calculating section is greater than a chroma threshold value γ, and using a hue plane color conversion table in which the achromatic colors are set as mixed colors of a plurality of colors when the chroma is not greater than the chroma threshold value γ.

9 Claims, 12 Drawing Sheets

Interpolated values using LUT in which achromatic colors are set as K-monochromatic colors and measured values after interpolation

| Input | | | Interpolated values | | | | Measured values | | | |
|---|---|---|---|---|---|---|---|---|---|---|
| R | G | B | C | M | Y | K | LAB L | LAB a | LAB b | LCH C |
| 0 | 0 | 0 | 0 | 0 | 0 | 255 | 17.53 | 0.026 | −0.54 | 0.54 |
| 1 | 0 | 0 | 6 | 7 | 6 | 251 | 18.45 | −0.1 | −0.69 | 0.69 |
| 2 | 0 | 0 | 11 | 14 | 13 | 248 | 19.07 | 0.005 | −0.55 | 0.55 |
| 3 | 0 | 0 | 17 | 22 | 19 | 244 | 19.85 | 0.124 | −0.55 | 0.56 |
| 4 | 0 | 0 | 22 | 29 | 25 | 240 | 20.62 | 0.231 | −0.35 | 0.42 |
| 5 | 0 | 0 | 28 | 36 | 32 | 236 | 21.29 | 0.309 | −0.23 | 0.38 |
| 6 | 0 | 0 | 34 | 43 | 38 | 233 | 21.68 | 0.343 | −0.07 | 0.35 |
| 7 | 0 | 0 | 39 | 51 | 44 | 229 | 22.23 | 0.518 | 0.046 | 0.52 |
| 8 | 0 | 0 | 45 | 58 | 50 | 225 | 22.73 | 0.552 | 0.188 | 0.58 |
| 9 | 0 | 0 | 51 | 65 | 57 | 222 | 22.97 | 0.677 | 0.365 | 0.77 |
| 10 | 0 | 0 | 56 | 72 | 63 | 218 | 23.38 | 0.818 | 0.547 | 0.98 |
| 11 | 0 | 0 | 62 | 79 | 69 | 214 | 23.69 | 0.948 | 0.702 | 1.18 |
| 12 | 0 | 0 | 67 | 87 | 76 | 211 | 23.77 | 1.176 | 1.01 | 1.55 |
| 13 | 0 | 0 | 73 | 94 | 82 | 207 | 23.91 | 1.289 | 1.119 | 1.71 |
| 14 | 0 | 0 | 79 | 101 | 88 | 203 | 24.04 | 1.651 | 1.229 | 2.06 |
| 15 | 0 | 0 | 84 | 108 | 95 | 199 | 24.21 | 1.665 | 1.766 | 2.43 |
| 16 | 0 | 0 | 90 | 115 | 101 | 196 | 24.16 | 1.9 | 1.971 | 2.74 |
| 17 | 0 | 0 | 95 | 123 | 107 | 192 | 24.14 | 2.39 | 2.201 | 3.25 |
| 18 | 0 | 0 | 101 | 130 | 114 | 188 | 24.08 | 2.756 | 2.35 | 3.62 |
| 19 | 0 | 0 | 107 | 137 | 120 | 185 | 23.75 | 3.122 | 2.342 | 3.9 |
| 20 | 0 | 0 | 112 | 144 | 126 | 181 | 23.57 | 3.632 | 2.457 | 4.39 |
| 21 | 0 | 0 | 118 | 152 | 132 | 177 | 23.21 | 4.165 | 2.468 | 4.84 |
| 22 | 0 | 0 | 124 | 159 | 139 | 174 | 22.83 | 4.457 | 2.551 | 5.14 |
| 23 | 0 | 0 | 129 | 166 | 145 | 170 | 22.54 | 4.895 | 2.662 | 5.57 |
| 24 | 0 | 0 | 135 | 173 | 151 | 166 | 22.55 | 5.596 | 2.546 | 6.15 |
| 25 | 0 | 0 | 140 | 180 | 158 | 162 | 22.44 | 6.325 | 2.798 | 6.92 |
| 26 | 0 | 0 | 146 | 188 | 164 | 159 | 21.73 | 6.614 | 2.683 | 7.14 |
| 27 | 0 | 0 | 152 | 195 | 170 | 155 | 21.27 | 6.881 | 2.73 | 7.4 |
| 28 | 0 | 0 | 157 | 202 | 177 | 151 | 20.93 | 6.981 | 2.932 | 7.57 |
| 29 | 0 | 0 | 163 | 209 | 183 | 148 | 20.45 | 7.097 | 2.996 | 7.7 |
| 30 | 0 | 0 | 168 | 216 | 189 | 144 | 20.13 | 7.841 | 3.11 | 8.44 |
| 31 | 0 | 0 | 174 | 224 | 195 | 140 | 19.81 | 7.791 | 2.908 | 8.32 |
| 32 | 0 | 0 | 179 | 230 | 201 | 137 | 19.58 | 7.896 | 2.768 | 8.37 |

FIG. 7A

Interpolated values using LUT in which achromatic colors are set as K-monochromatic colors and measured values after interpolation

| Input | | | Interpolated values | | | | Measured values | | | |
|---|---|---|---|---|---|---|---|---|---|---|
| R | G | B | C | M | Y | K | LAB L | LAB a | LAB b | LCH C |
| * 0 | 0 | 0 | 225 | 218 | 187 | 140 | 17.73 | 0.42 | −0.69 | 0.81 |
| 1 | 0 | 0 | 223.6 | 218.4 | 187.4 | 139.9 | 17.8 | 0.56 | −0.64 | 0.85 |
| 2 | 0 | 0 | 222.1 | 218.8 | 187.9 | 139.7 | 17.89 | 0.86 | −0.49 | 0.99 |
| 3 | 0 | 0 | 220.7 | 219.1 | 188.3 | 139.6 | 17.97 | 0.97 | −0.44 | 1.07 |
| 4 | 0 | 0 | 219.2 | 219.5 | 188.8 | 139.5 | 18.12 | 1.28 | −0.29 | 1.31 |
| 5 | 0 | 0 | 217.8 | 219.9 | 189.2 | 139.4 | 18.2 | 1.39 | −0.25 | 1.41 |
| 6 | 0 | 0 | 216.3 | 220.3 | 189.6 | 139.2 | 18.32 | 1.58 | −0.05 | 1.58 |
| 7 | 0 | 0 | 214.9 | 220.6 | 190.1 | 139.1 | 18.3 | 1.86 | −0.03 | 1.86 |
| 8 | 0 | 0 | 213.5 | 221 | 190.5 | 139 | 18.39 | 2.09 | 0.18 | 2.1 |
| 9 | 0 | 0 | 212 | 221.4 | 191 | 138.9 | 18.43 | 2.23 | 0.23 | 2.24 |
| 10 | 0 | 0 | 210.6 | 221.8 | 191.4 | 138.7 | 18.41 | 2.51 | 0.25 | 2.52 |
| 11 | 0 | 0 | 209.1 | 222.1 | 191.8 | 138.6 | 18.66 | 2.74 | 0.42 | 2.77 |
| 12 | 0 | 0 | 207.7 | 222.5 | 192.3 | 138.5 | 18.7 | 3.04 | 0.44 | 3.07 |
| 13 | 0 | 0 | 206.2 | 222.9 | 192.7 | 138.4 | 18.81 | 3.27 | 0.65 | 3.33 |
| 14 | 0 | 0 | 204.8 | 223.3 | 193.1 | 138.2 | 18.85 | 3.41 | 0.7 | 3.48 |
| 15 | 0 | 0 | 203.4 | 223.6 | 193.6 | 138.1 | 18.8 | 3.78 | 0.89 | 3.88 |
| 16 | 0 | 0 | 201.9 | 224 | 194 | 138 | 18.84 | 3.92 | 0.94 | 4.03 |
| 17 | 0 | 0 | 200.5 | 224.4 | 194.5 | 137.9 | 18.96 | 4.21 | 1.05 | 4.34 |
| 18 | 0 | 0 | 199 | 224.8 | 194.9 | 137.9 | 18.96 | 4.43 | 1.16 | 4.58 |
| 19 | 0 | 0 | 197.6 | 225.2 | 195.3 | 137.8 | 19.01 | 4.58 | 1.22 | 4.74 |
| 20 | 0 | 0 | 196.1 | 225.5 | 195.8 | 137.7 | 19.02 | 4.95 | 1.39 | 5.14 |
| 21 | 0 | 0 | 194.7 | 225.9 | 196.2 | 137.7 | 19.07 | 5.09 | 1.45 | 5.29 |
| 22 | 0 | 0 | 193.3 | 226.3 | 196.7 | 137.6 | 19.17 | 5.32 | 1.65 | 5.57 |
| 23 | 0 | 0 | 191.8 | 226.7 | 197.1 | 137.6 | 19.13 | 5.6 | 1.68 | 5.85 |
| 24 | 0 | 0 | 190.4 | 227 | 197.5 | 137.5 | 19.3 | 5.87 | 1.9 | 6.17 |
| 25 | 0 | 0 | 188.9 | 227.4 | 198 | 137.4 | 19.35 | 6.02 | 1.96 | 6.33 |
| 26 | 0 | 0 | 187.5 | 227.8 | 198.4 | 137.4 | 19.35 | 6.44 | 2.04 | 6.76 |
| 27 | 0 | 0 | 186 | 228.2 | 198.9 | 137.3 | 19.41 | 6.53 | 2.19 | 6.89 |
| 28 | 0 | 0 | 184.6 | 228.5 | 199.3 | 137.2 | 19.36 | 6.81 | 2.22 | 7.16 |
| 29 | 0 | 0 | 183.1 | 228.9 | 199.7 | 137.2 | 19.47 | 7.04 | 2.43 | 7.45 |
| 30 | 0 | 0 | 181.7 | 229.3 | 200.2 | 137.1 | 19.52 | 7.19 | 2.48 | 7.61 |
| 31 | 0 | 0 | 180.3 | 229.7 | 200.6 | 137.1 | 19.53 | 7.56 | 2.66 | 8.01 |
| * 32 | 0 | 0 | 178.8 | 230 | 201 | 136.9 | 19.58 | 7.7 | 2.71 | 8.16 |

FIG. 8A

COLOR CONVERTING DEVICE AND METHOD PERFORMING COLOR CONVERSIONS USING A FIRST COLOR CONVERSION TABLE WHEN FIRST COLOR VALUE SATISFIES A PRESET CONDITION AND USING A SECOND COLOR CONVERSION TABLE WHEN FIRST COLOR VALUE DOES NOT SATISFY THE PRESET CONDITION

INCORPORATION BY REFERENCE

The present application claims priority under 35 U.S.C. §119 to Japanese Patent Application No. 2013-222192, filed Oct. 25, 2013. The contents of this application are incorporated herein by reference in their entirety.

BACKGROUND

The present disclosure relates to a color converting device, an image forming apparatus, and a color converting method for performing color conversion with a high degree of accuracy.

An image forming apparatus such as a multifunction peripheral (MFP) that prints character objects and image objects such as diagrams is a known art.

The image forming apparatus uses color values according to an RGB (Red, Green, Blue) color space as printing data. In contrast, the image forming apparatus typically uses color values according to a CMYK (Cyan, Magenta, Yellow, black/Key plate) color space when outputting (i.e., printing) to a recording sheet.

As a consequence, the image forming apparatus is required to convert color values in the RGB color space to color values in the CMYK color space in order to form (print) an image on the recording sheet.

Conversion from the RGB color space to the CMYK color space is performed using a color conversion table (i.e., a look-up table; LUT). In the color conversion table, a value in the CMYK color space corresponding to a value in the RGB color space is stored for each of a plurality of lattice points that partition the RGB color space at preset intervals. With regards to a color value in the RGB space for a point that is not one of the lattice points, a corresponding color value in the CMYK color space is calculated through interpolation calculation. The interpolation calculation is performed by linear interpolation or approximation-type interpolation.

In a known technique for increasing accuracy of color conversion, a color value is first converted to a cylindrical coordinate space and non-linear interpolation is performed using a spline function.

SUMMARY

A color converting device according to the present disclosure converts a first color value acquired from printing data to a second color value. The color converting device includes a color value converting section. The color value converting section converts the first color value to the second color value using a first color conversion table in which achromatic colors are set as monochromatic colors when the first color value satisfies a preset condition. The color value converting section converts the first color value to the second color value using a second color conversion table in which the achromatic colors are set as mixed colors of a plurality of colors when the first color value does not satisfy the preset condition.

An image forming apparatus relating to the present disclosure converts a first color value acquired from printing data to a second color value when rendering the printing data and forms an image. The image forming apparatus includes a color value converting section. The color value converting section converts the first color value to the second color value using a first color conversion table in which achromatic colors are set as monochromatic colors when the first color value satisfies a preset condition, and converts the first color value to the second color value using a second color conversion table in which the achromatic colors are set as mixed colors of a plurality of colors when the first color value does not satisfy the preset condition.

A color converting method according to the present disclosure is implemented by a color converting device for converting a first color value acquired from printing data to a second color value. The color converting method includes converting the first color value to the second color value using different color conversion tables based on whether or not the first color value satisfies a preset condition. More specifically, the first color value is converted to the second color value using a first color conversion table in which achromatic colors are set as monochromatic colors when the first color value satisfies a preset condition. On the other hand, the first color value is converted to the second color value using a second color conversion table in which the achromatic colors are set as mixed colors of a plurality of colors when the first color value does not satisfy the preset condition.

BRIEF DESCRIPTION OF THE DRAWINGS

FIGS. 7A and 7B illustrate results of color conversion in proximity to achromatic colors using a color conversion table in a comparative example.

FIGS. 8A and 8B illustrate results of color conversion in proximity to achromatic colors in an example of the present disclosure.

DETAILED DESCRIPTION

Embodiment

Figure 1:
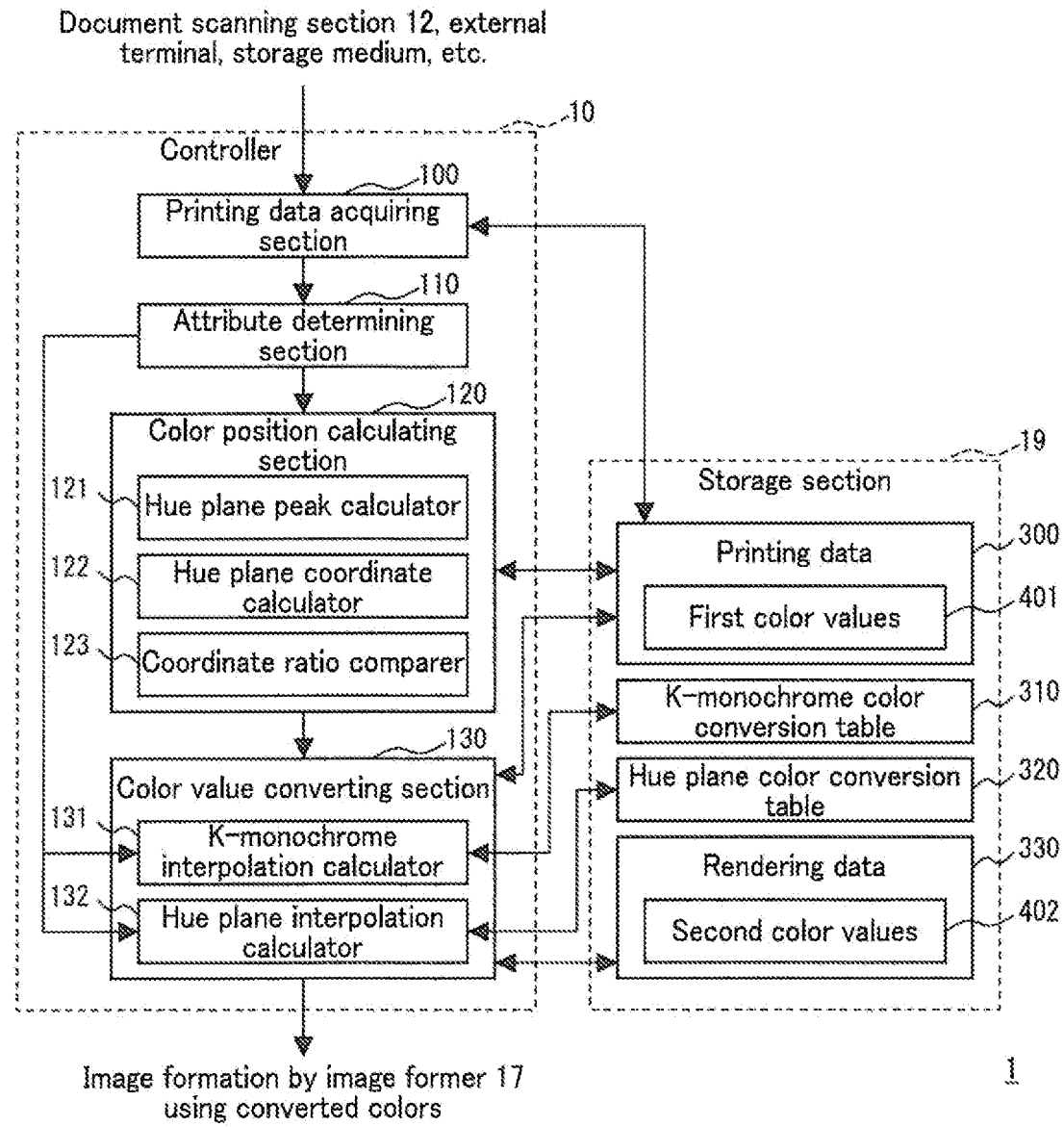
FIG. 1 illustrates functional blocks of an image forming apparatus according to an embodiment of the present disclosure.

Overall Configuration of Image Forming Apparatus 1

General configuration of an image forming apparatus 1 is first explained with reference to FIG. 9.

The image forming apparatus 1 includes a controller 10, an image processing section 11, a document scanning section 12, a document feeder 13, a conveying section, a network transmitting and receiving section 15, an operation panel 16, an image former 17, a fax transmitting and receiving section 18, and a storage section 19. The image processing section 11, the document scanning section 12, the document feeder 13, the conveying section, the network transmitting and receiving section 15, the operation panel 16, the image former 17, the fax transmitting and receiving section 18, and the storage section 19 are each connected to the controller 10 through a common bus. The controller 10 controls operation of each of the above listed elements. The conveying section includes a paper feed roller 42b, a pair of conveyance rollers 44, and a pair of ejection rollers 45.

The controller 10 includes a general purpose processor (GPP), a central processing unit (CPU), a micro processing unit (MPU), a digital signal processor (DSP), a graphics processing unit (GPU), and an application-specific integrated circuit (ASIC).

The controller 10 reads a control program from read only memory (ROM) or a hard disk drive (HDD) of the storage section 19 and executes the control program by developing the control program in random access memory (RAM). Through the above, the controller 10 operates as various elements configuring functional blocks that are explained further below with reference to FIG. 1. The controller 10 also controls overall operation of the image forming apparatus 1 based on instruction information that is input from the operation panel 16 or an external terminal (not illustrated).

The image processing section 11 includes a DSP and a GPU. The image processing section 11 performs various types of image processing on image data. Examples of the image processing performed by the image processing section 11 include scaling, density adjustment, gradation adjustment, and image quality improvement.

The image processing section 11 receives image data that is read by the document scanning section 12 and stores the image data in the storage section 19 as printing data 300. During the above, the image processing section 11 can convert the printing data 300 to various different image formats such as portable document format (PDF) or tagged image file format (TIFF).

The document scanning section 12 reads (i.e., scans) an image on a loaded original document.

The document feeder 13 conveys the original document on which the image read by the document scanning section 12 is formed.

Based on a printing instruction from a user, the image former 17 acquires image data and forms (i.e., prints) an image corresponding to the image data on a recording sheet. The image data may be the printing data 300 (image data) stored in the storage section 19, the image data read by the document scanning section 12, or image data acquired from an external terminal.

Figure 10:
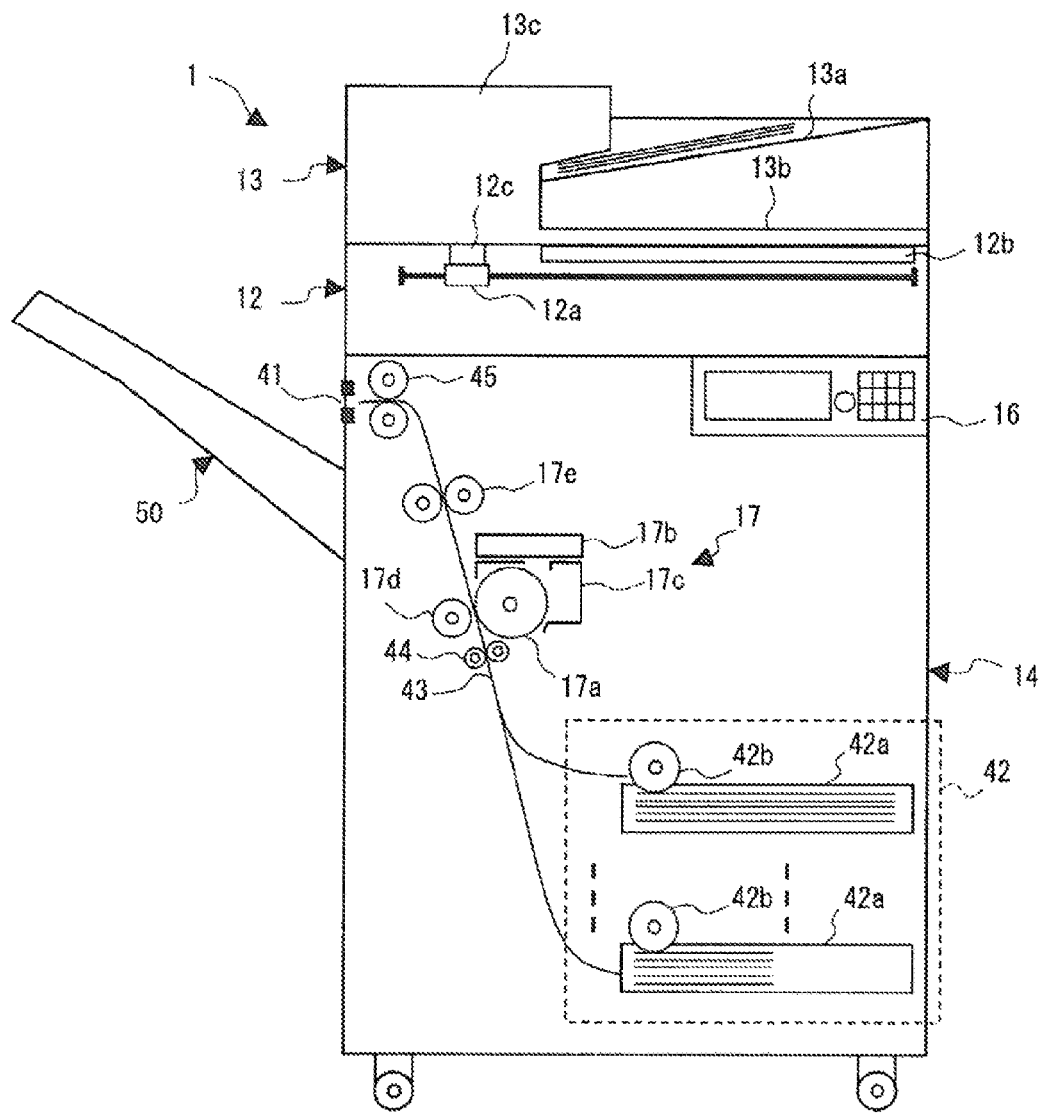
FIG. 10 illustrates overall configuration of an image forming apparatus according to an embodiment of the present disclosure.

As illustrated in FIG. 10, the conveying section picks up a recording sheet from a paper feed cassette 42a, conveys the recording sheet to the image former 17 where an image is formed thereon, and subsequently conveys the recording sheet to a stacking tray 50.

Detailed explanation of operation of the document scanning section 12, the document feeder 13, the conveying section, and the image former 17 is provided further below with reference to FIG. 10.

Figure 9:
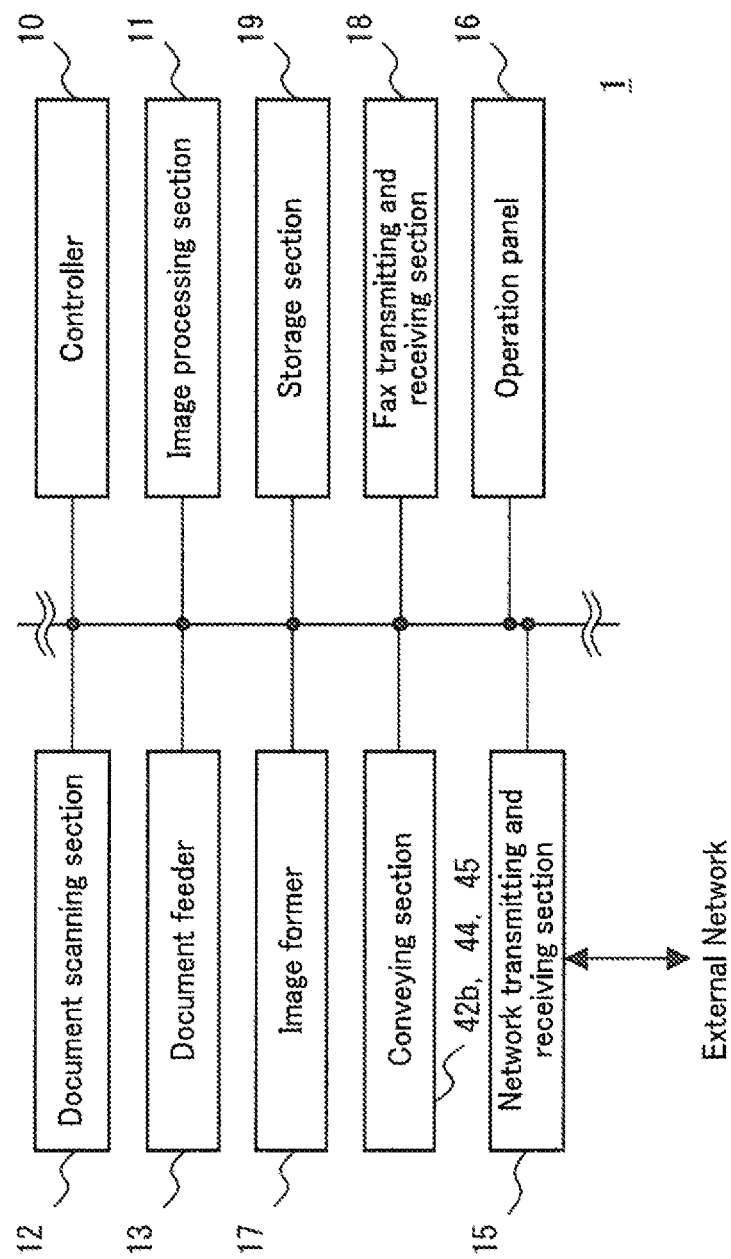
FIG. 9 illustrates general configuration of an image forming apparatus according to an embodiment of the present disclosure.

As illustrated in FIG. 9, the network transmitting and receiving section 15 includes a wireless transmitter and receiver, and a local area network (LAN) board that is connected in a communicable manner to an external network, such as a LAN, a wireless LAN, a wide area network (WAN), or a public telephone line.

The operation panel 16 includes an input section and a display section such as a liquid-crystal display (LCD). The input section includes various different types of buttons. The various buttons for example include a numeric keypad, a start button, and a cancel button. The various buttons also include buttons for switching between different operating modes such as copying, facsimile transmitting, and scanning. The various buttons also include buttons for inputting instructions for executing jobs, such as a printing process, a transmission process, or a saving process, with respect to the printing data 300 that is selected. In an alternative configuration in which the input section includes a touch panel, some or all of the various buttons may be displayed on the touch panel.

The operation panel 16 receives instructions from the user with respect to the image forming apparatus 1 for various different types of jobs. Account information for each user can be input and changed based on instructions received from the user by the operation panel 16.

The fax transmitting and receiving section 18 is connected to a public telephone line, an integrated services digital network (ISDN) line, or an optical line, and performs transmission and reception of facsimiles.

The fax transmitting and receiving section 18 stores image data of a receive facsimile as printing data 300 (refer to FIG. 1) in the storage section 19. Note that instead of rendering data 330 stored in the storage section 19 being outputted through printing on a recording sheet by the image former 17, the rendering data 330 may alternatively be outputted through transmission as a facsimile by the fax transmitting and receiving section 18.

The storage section 19 includes a storage medium such as a HDD, and a semiconductor memory including RAM and ROM.

The RAM of the storage section 19 can for example hold onto stored data through a self-refresh function even when the image forming apparatus 1 is in an energy saving mode. In other words, the stored data is not deleted.

The ROM or the HDD of the storage section 19 stores therein the control program through which the controller 10 controls operation of the image forming apparatus 1. Note that the control program includes a color conversion program. Also note that the storage section 19 is an example of a non-transitory computer-readable storage medium having a color conversion program recorded thereon. The storage section 19 also stores account information for each user. The storage section 19 may also include a region for data folders in which data is stored for each user.

The controller 10 and the image processing section 11 of the image forming apparatus 1 may alternatively be integrated together, for example as a CPU having an internal GPU or as a chip on module package.

The controller 10 and the image processing section 11 may for example alternatively include RAM, ROM, and flash memory.

[Operation of Image Forming Apparatus 1]

The following explains operation of the image forming apparatus 1 according to the embodiment of the present disclosure with reference to FIG. 10.

The document scanning section 12 is located above a main body 14 of the image forming apparatus 1. The document feeder 13 is located above the document scanning section 12. The stacking tray 50 is located on a side surface of the main body 14 on which an exit port 41 for recording sheets is located. The operation panel 16 is located on a front surface of the image forming apparatus 1.

The document scanning section 12 includes a scanner 12a, platen glass 12b, and a document scanning slit 12c. The scanner 12a includes a light exposure lamp and an imaging component such as a charge coupled device (CCD) or a complementary metal oxide semiconductor (CMOS). The scanner 12a is moveable in a direction in which an original document is conveyed by the document feeder 13 (i.e., a left-right direction in FIG. 10).

The platen glass 12b is made from a transparent material such as glass and acts as a document table on which an original document can be loaded. The document scanning slit 12c is a slit formed in a direction perpendicular to the direction in which the original document is conveyed by the document feeder 13 (i.e., a direction perpendicular to a plane on which FIG. 10 is illustrated).

When an image is to be read that is formed on an original document loaded on the platen glass 12b, the scanner 12a first moves to a position at one edge of the platen glass 12b in terms of the left-right direction (for example, a position at a left edge of the platen glass 12b), and subsequently reads the image, which is formed on the original document loaded on the platen glass 12b, while moving. The scanner 12a outputs image data read thereby to the controller 10 (refer to FIG. 9) located in the main body 14.

On the other hand, when an image is to be read that is formed on an original document conveyed by the document feeder 13, the scanner 12a first moves to a position opposite the document scanning slit 12c, and subsequently reads the image formed on the original document through the document scanning slit 12c in synchronization with a conveyance operation of the original document by the document feeder 13. The scanner 12a outputs image data read thereby to the controller 10 (refer to FIG. 9) located in the main body 14.

The document feeder 13 includes a document loading section 13a, a document ejection section 13b, and a document conveying mechanism 13c. The document conveying mechanism 13c picks up, one sheet at a time, an original document loaded in the document loading section 13a, conveys the sheet of the original document to a position opposite the document scanning slit 12c, and subsequently ejects the sheet into the document ejection section 13b.

Note that the document feeder 13 can be freely opened and closed, and thus lifting up a front side of the document feeder 13 exposes an upper surface of the platen glass 12b. When the upper surface of the platen glass 12b is exposed, an original document that cannot be conveyed by the document feeder 13 (for example, a book or a notebook) can be loaded on the upper surface of the platen glass 12b.

The main body 14 includes the image former 17, a paper feeder 42, a paper conveyance path 43, the pair of conveyance rollers 44, and the pair of ejection rollers 45. The paper feeder 42 includes a plurality of paper feed cassettes 42a and a plurality of paper feed rollers 42b provided in one-to-one correspondence with the paper feed cassettes 42a. The paper feed cassettes 42a each store recording sheets therein. Each of the paper feed rollers 42b picks up recording sheets one at a time from a corresponding one of the paper feed cassettes 42a, and feeds each of the recording sheets into the paper conveyance path 43. The paper feed rollers 42b, the pair of conveyance rollers 44, and the pair of ejection rollers 45 function as the conveying section. The recording sheets stored in each of the paper feed cassettes 42a are conveyed by the conveying section.

A recording sheet that is fed into the paper conveyance path 43 by one of the paper feed rollers 42b is then conveyed to the image former 17 by the pair of conveyance rollers 44. Once an image has been formed on the recording sheet by the image former 17, the recording sheet is ejected onto the stacking tray 50 by the pair of ejection rollers 45.

The image former 17 includes a photosensitive drum 17a, a light exposure section 17b, a development section 17c, a transfer section 17d, and a fixing section 17e. The light exposure section 17b is an optical unit including a laser, a mirror, a lens, and a light emitting diode (LED) array. The light exposure section 17b emits laser light based on image data and irradiates the photosensitive drum 17a with the laser light, thereby causing formation of an electrostatic latent image on the surface of the photosensitive drum 17a. The development section 17c uses a toner to develop the electrostatic latent image formed on the photosensitive drum 17a. In other words, the development section 17c forms a toner image on the photosensitive drum 17a that corresponds to the electrostatic latent image. The transfer section 17d transfers the toner image, formed on the photosensitive drum 17a by the development section 17c, onto the recording sheet. The fixing section 17e heats the recording sheet having the toner image transferred thereon by the transfer section 17d, thereby fixing the toner image to the recording sheet.

[Functional Block Configuration of Image Forming Apparatus 1]

The following explains configuration of functional blocks of the image forming apparatus 1 with reference to FIG. 1.

The controller 10 of the image forming apparatus 1 functionally includes a printing data acquiring section 100, an attribute determining section 110, a color position calculating section 120, and a color value converting section 130. More specifically, the controller 10 implements the functions of the printing data acquiring section 100, the attribute determining section 110, the color position calculating section 120, and the color value converting section 130 by reading the control program stored in the ROM or the HDD of the storage section 19 and executing the control program through development of the control program in the RAM.

The storage section 19 stores therein the printing data 300, a K-monochrome color conversion table 310 (an example of the first color conversion table), a hue plane color conversion table 320 (an example of the second color conversion table), and the rendering data 330.

The printing data acquiring section 100 acquires the printing data 300 from the document scanning section 12, the fax transmitting and receiving section 18, or a device connected to the network transmitting and receiving section 15 (for example, an external terminal, a server, or an external storage medium). The printing data acquiring section 100 stores the printing data 300 acquired thereby in the storage section 19. A color value of each pixel configuring image data of an object included in the printing data 300 is stored in the storage section 19 as a first color value 401.

The attribute determining section 110 determines attributes of data included in the printing data 300. The attribute determining section 110 may determine an attribute for data of each object, such as a character or an image (for example, a diagram), included in the printing data 300.

The color position calculating section 120 calculates a hue plane and a chroma of each of the first color values 401 in an RGB color space. More specifically, the color position calculating section 120 sets a color value of each pixel configuring image data of the object of the printing data 300 as a first color value 401, and calculates a hue plane and a chroma of the first color value 401 in the RGB color space.

The color position calculating section 120 includes a hue plane peak calculator 121, a hue plane coordinate calculator 122, and a coordinate ratio comparer 123.

The hue plane peak calculator 121 calculates the hue plane of the first color value 401 in the RGB color space by referring to the hue plane color conversion table 320. With respect to the hue plane in which the first color value 401 is included, the hue plane peak calculator 121 calculates a color value (herein referred to as a peak color value) having a greatest chroma among all color values included in the hue plane. More detailed explanation of the hue plane peak calculator 121 is provided further below through explanation of Step S105 in FIG. 3 with reference to FIGS. 4A and 4B.

The hue plane coordinate calculator 122 calculates a positional relationship between the first color value 401 and the peak color value calculated by the hue plane peak calculator 121, and calculates a distance ratio $\beta q$ of respective distances to an achromatic color. More detailed explanation of the hue plane coordinate calculator 122 is provided further below through explanation of Step S106 in FIG. 3 with reference to FIGS. 5A and 5B.

The coordinate ratio comparer 123 compares the distance ratio $\beta q$ calculated by the hue plane coordinate calculator 122 and a threshold value $\alpha$ set based on a number N of lattice points in the RGB color space. More detailed explanation of the coordinate ratio comparer 123 is provided further below through explanation of Step S107 in FIG. 3 with reference to FIGS. 5A and 5B.

The color value converting section 130 converts the first color value 401 to a second color value 402 using the K-monochrome color conversion table 310 in which achromatic colors are set as monochromatic colors when the coordinate ratio comparer 123 judges that the distance ratio $\beta q$ is greater than the threshold value $\alpha$. On the other hand, the color value converting section 130 converts the first color value 401 to the second color value 402 using the hue plane color conversion table 320 in which achromatic colors are set as mixed colors of a plurality of colors when the coordinate ratio comparer 123 judges that the distance ratio $\beta q$ is not greater than the threshold value $\alpha$.

The present embodiment is explained for a configuration in which the color value converting section 130 switches between the K-monochrome color conversion table 310 and the hue plane color conversion table 320 based on the distance ratio $\beta q$. However, alternatively the color value converting section 130 may switch between the K-monochrome color conversion table 310 and the hue plane color conversion table 320 based on the chroma of the first color value 401 calculated by the color position calculating section 120.

In such an alternative configuration, the color value converting section 130 converts the first color value 401 to the second color value 402 using the K-monochrome color conversion table 310 when the chroma of the first color value 401 calculated by the color position calculating section 120 is greater than a preset chroma threshold value $\gamma$. On the other hand, the color value converting section 130 converts the first color value 401 to the second color value 402 using the hue plane color conversion table 320 when the chroma of the first color value 401 calculated by the color position calculating section 120 is not greater than the chroma threshold value $\gamma$.

The chroma threshold value $\gamma$ is preferably set based on the hue of the first color value 401.

The color value converting section 130 renders an object corresponding to the printing data 300 using second color values 402 acquired through conversion of the first color values 401, and thereby generates rendering data 330.

The color value converting section 130 includes a K-monochrome interpolation calculator 131 (an example of the first interpolation calculator) and a hue plane interpolation calculator 132 (an example of the second interpolation calculator).

The K-monochrome interpolation calculator 131 performs interpolation calculation to convert the first color value 401 to the second color value 402 using the K-monochrome color conversion table 310 when the distance ratio $\beta q$ calculated for the first color value 401 by the coordinate ratio comparer 123 is greater than the ratio threshold value $\alpha$.

On the other hand, the hue plane interpolation calculator 132 performs interpolation calculation to convert the first color value 401 to the second color value 402 using the hue plane color conversion table 320 when the distance ratio $\beta q$ calculated for the first color value 401 by the coordinate ratio comparer 123 is not greater than the ratio threshold value $\alpha$.

The present embodiment is explained for a configuration in which the table (the K-monochrome color conversion table 310 or the hue plane color conversion table 320) used for interpolation calculation is switched based on the distance ratio $\beta q$ calculated by the coordinate ratio comparer 123. However, alternatively the table (the K-monochrome color conversion table 310 or the hue plane color conversion table 320) used for interpolation calculation may be switched based on the chroma of the first color value 401 calculated by the color position calculating section 120.

In such an alternative configuration, the K-monochrome interpolation calculator 131 performs interpolation calculation to convert the first color value 401 to the second color value 402 using the K-monochrome color conversion table 310 when the chroma of the first color value 401 calculated by the color position calculating section 120 is greater than the chroma threshold value $\gamma$. On the other hand, the hue plane interpolation calculator 132 performs interpolation calculation to convert the first color value 401 to the second color value 402 using the hue plane color conversion table 320 when the chroma of the first color value 401 calculated by the color position calculating section 120 is not greater than the chroma threshold value $\gamma$.

The printing data 300 is document data acquired from the document scanning section 12, the fax transmitting and receiving section 18, or a device connected to the network transmitting and receiving section 15. The printing data 300 is data in PDL (Page Description Language) format, data in an electronic document format such as PDF, or data in an image format such JPEG (Joint Photographic Experts Group), GIF (Graphics Interchange Format), or bitmap. The printing data 300 may include various types of setting data. The printing data 300 may further include property information such as a file name, a file type, a creation time, an update time, and a viewing time.

The printing data 300 includes data that is for example in units of objects such as diagrams and characters. The data of each of the objects includes first color values 401.

Each of the first color values 401 is data indicating a color value (i.e., coordinates) in the RGB color space. The first color value 401 includes gradation data for each of the R, G, and B colors.

The K-monochrome color conversion table 310 stores therein a conversion value for each of a plurality of lattice points set at preset intervals in the RGB color space. The conversion value is a value for conversion to a CMYK color space. In other words, in the K-monochrome color conversion table 310, for each of a plurality of lattice points set at equal intervals in the RGB color space, a value (conversion value) is stored for converting an RGB color corresponding to the lattice point to a CMYK color. Note that in the K-monochrome color conversion table 310, values for K-monochromatic colors (one example of a set of monochromatic colors) are stored for lattice points corresponding to achromatic colors.

The K-monochrome color conversion table 310 is used for color conversion when the object of the printing data 300 is not an image object. The K-monochrome color conversion table 310 is also used when the object of the printing data 300 is an image object, so long as the distance ratio βq calculated by the hue plane coordinate calculator 122 is greater than the ratio threshold value α.

The hue plane color conversion table 320 stores therein a conversion value for each of a plurality of lattice points spaced a finer intervals than for the K-monochrome color conversion table 310 in hue planes set to partition the RGB color space at preset intervals. The conversion value is a value for conversion to the CMYK color space. Note that in the hue plane color conversion table 320, values for CMYK mixed colors are stored for lattice points corresponding to achromatic colors.

The hue plane color conversion table 320 is used for color conversion when the object of the printing data 300 is an image object and the distance ratio βq calculated by the hue plane coordinate calculator 122 is not greater than the ratio threshold value α.

The rendering data 330 is bitmap data, or compressed data resulting from run-length encoding of the bitmap data, that is printed onto a recording sheet by the image former 17. The rendering data 330 may be converted to PDF data or JPEG data by the controller 10 and transmitted to an external terminal, or may be transmitted as a facsimile by the fax transmitting and receiving section 18.

The rendering data 330 includes the second color values 402 that are obtained through color conversion of the first color values 401.

Each of the second color values 402 is a color value indicating a color in the CMYK color space. The second color value 402 includes gradation data for each of the C, M, Y, and K colors.

The controller 10 of the image forming apparatus 1 implements functions of the printing data acquiring section 100, the attribute determining section 110, the color position calculating section 120, the hue plane peak calculator 121, the hue plane coordinate calculator 122, the coordinate ratio comparer 123, the color value converting section 130, the K-monochrome interpolation calculator 131, and the hue plane interpolation calculator 132 by executing a control program stored in the storage section 19.

The functional elements included in the controller 10 of the image forming apparatus 1 implement a color converting method according to the present disclosure.

[Detailed Description of K-Monochrome Color Conversion Table 310 and Hue Plane Color Conversion Table 320]

Figure 2A:
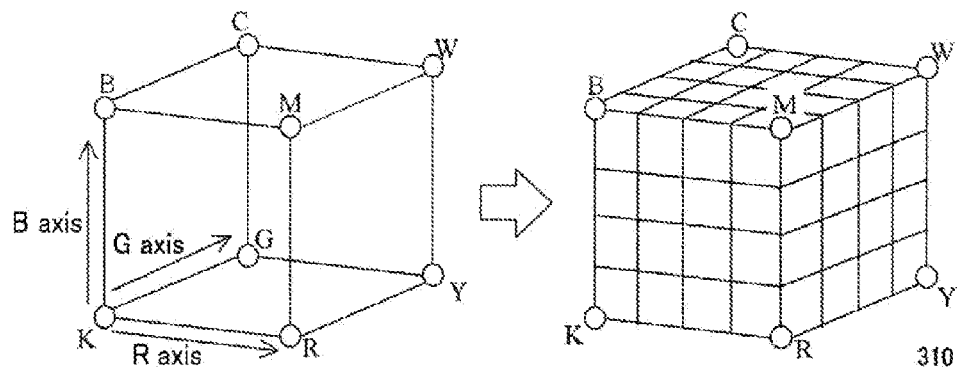
FIGS. 2A-2C illustrate a general concept of a K-monochrome color conversion table and a hue plane color conversion table of the image forming apparatus in FIG. 1.
Figure 2B:
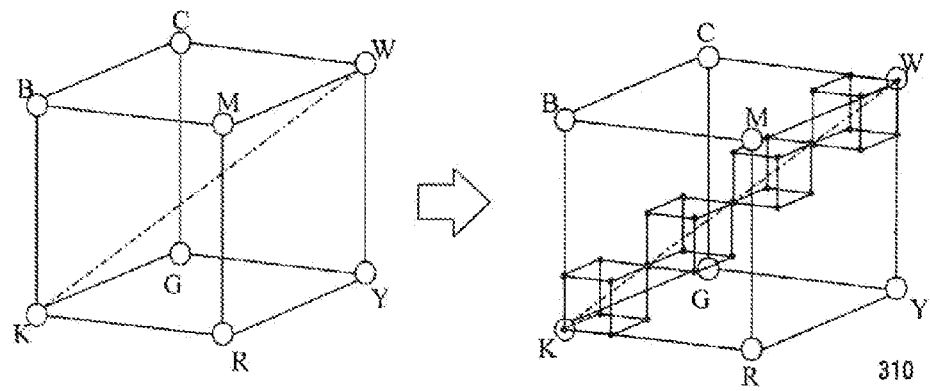
Figure 2C:
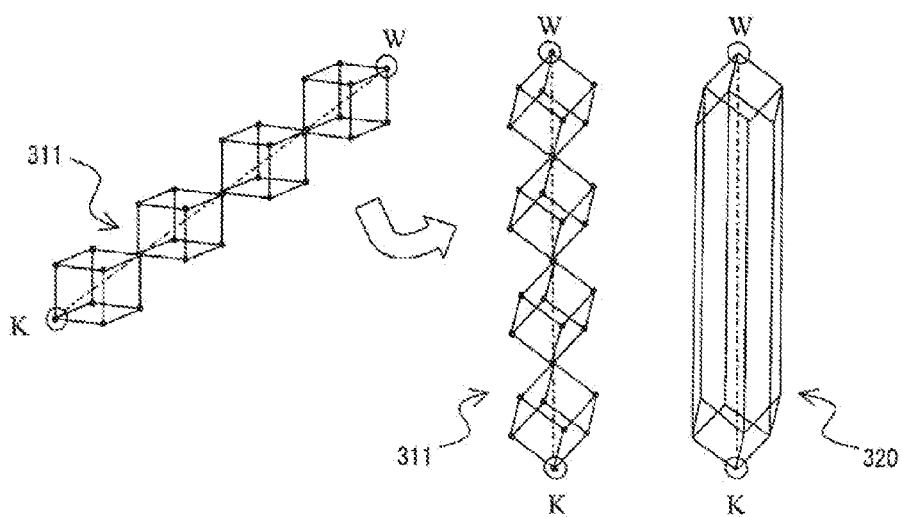

FIGS. 2A-2C illustrate a general concept of the K-monochrome color conversion table 310 and the hue plane color conversion table 320 according to the present embodiment.

The left-hand side of FIG. 2A illustrates an example in which the RGB color space is represented as a cube in a three dimensional space. The RGB color space is a color space of an additive color system. More specifically, the cube shown on the left-hand side of FIG. 2A indicates a position of each color resulting from color addition along R (Red), G (Green), and B (Blue) axes starting from a point K (black). For example, when gradation of each of the R, G and B colors is represented by 8 bits (i.e., values 0 to 255), apices of the cube include the point K indicating black, represented as RGB=(0,0,0), a point R indicating red, represented as RGB=(255,0,0), a point G indicating green, represented as RGB=(0,255,0), and a point B indicating B, represented as RGB=(0,0,255). Apices of the cube indicating colors resulting from addition of two of the R, B, and G colors are a point Y indicating yellow, represented as RGB=(255,255,0), a point C indicating cyan, represented as RGB=(0,255,255), and a point M indicating magenta, represented as RGB=(255,0,255). Furthermore, an apex of the cube indicating a color resulting from addition of all three of the R, G, and B colors is a point W indicating white, represented as RGB=(255,255,255).

The right-hand side of FIG. 2A illustrates a general concept of generating a color conversion table for which the three axes composing the RGB color space (R, G and B axes) are partitioned by lattice points set at equal intervals. When the gradation of each of the R, G, and B colors is represented by 8 bits as described above, preferably approximately 17,000,000 conversion values for conversion to the CMYK color space are stored in the color conversion table. Note that 17,000,000 is approximately equal to the number of gradation values, 256, to the power of 3. However, storing all of the aforementioned conversion values is unrealistic as such storage would require an excessively large amount of storage capacity and would result in an excessive amount of time being required for a process of searching for an appropriate conversion value. As a consequence, the gradation (256 values in the present example) is partitioned into blocks of a plurality of values (4 values in the present example), and a conversion value for conversion to a CMYK color is stored for each of a plurality of lattice points corresponding to partition intersections in the RGB color space. The right-hand side of FIG. 2A illustrates an example in which the each of the 8-bit gradations (256 values) is partitioned into four parts such that there are five lattice points along each of the axes and the K-monochrome color conversion table 310 is generated such as to store a conversion value for conversion to a CYMK color for each of the lattice points. When the K-monochrome color conversion table 310 is used for an RGB color that does not correspond to a lattice point, a CMYK color is calculated through interpolation using the conversion values of two to four lattice points that are in proximity to a point corresponding to the RGB color.

The left-hand side of FIG. 2B illustrates that a line in the RGB color space connecting the point K, indicating black, and the point W, indicating white, is an achromatic axis. In other words, achromatic points RGB=(0,0,0), RGB=(1,1,1), RGB=(2,2,2), . . . , RGB=(255,255,255) are located along the axis connecting the point K and the point W.

The right-hand side of FIG. 2B illustrates, from among the lattice points shown on the right-hand side of FIG. 2A, lattice points that are in proximity to the achromatic axis in the RGB color space of the K-monochrome color conversion table 310. Among lattice points in the CMYK color space resulting from conversion using the K-monochrome color conversion table 310, coordinates (c,m,y,k) in the CMYK color space for points corresponding to achromatic colors are coordinates of K-monochromatic colors, such as CMYK=(0,0,0,0), . . . , CMYK=(0,0,0,255) when each of the C, M, Y, and K colors has an 8-bit gradation.

The left-hand side of FIG. 2C illustrates a cut-out of a group of lattice points 311 that includes the achromatic axis shown on the right-hand side of FIG. 2B. When the lattice points for the K-monochrome color conversion table 310 are at equal intervals, the group of lattice points 311 are used for interpolation with respect to points in proximity to achromatic points corresponding to the achromatic colors.

The right-hand side of FIG. 2C illustrates the group of lattice points 311 including the achromatic axis shown on the left-hand side of FIG. 2C, orientated such that the achromatic axis is in a vertical direction at the center of the group of lattice points 311. The right-hand side of FIG. 2C also illustrates a space that is surrounded by the group of lattice points 311. The space in proximity to the achromatic points is composed of a portion included in lattice cubes which the achromatic axis passes through and a portion not included in the lattice cubes which the achromatic axis passes through. Thus, when the K-monochrome color conversion table 310 is used for conversion of a point surrounded by the group of lattice points 311 in the RGB color space, the calculation error is greater if the point is not included in the lattice cubes which the achromatic axis passes through.

A person's sense of sight is particularly sensitive to errors in colors in proximity to achromatic colors. As a consequence, the hue plane color conversion table 320 in which a finer array of lattice points are set than in the K-monochrome color conversion table 310 is used in the present embodiment with respect to a region centered on the achromatic axis for which the preset ratio threshold value α is not exceeded. As explained further below with reference to FIGS. 6A, 6B, 7A, 7B, 8A, and 8B, conversion values to mixed colors of a plurality of the C, M, Y, and K colors are set in the hue plane color conversion table 320 even for achromatic colors. The above enables accurate color conversion even for colors in proximity to achromatic colors. Also, as explained further below with reference to FIGS. 6A, 6B, 7A, 7B, 8A, and 8B, conversion values for conversion to CMYK colors are set in the hue plane color conversion table 320 for each of a plurality of hue planes (refer to FIG. 5A) that partition the RGB color space using the achromatic axis as a center and directions toward the R, M, B, C, G, and Y apices as hues.

Herein, each of the conversion values stored in the K-monochrome color conversion table 310 and the hue plane color conversion table 320 is a value indicating coordinates (c,m,y,k) in the CMYK color space corresponding to coordinates (r,g,b) of a lattice point in the RGB color space. Therefore, the conversion value is composed of four numerical values. [Color Conversion Rendering Process of Image Forming Apparatus 1]

The following explains a color conversion rendering process performed by the image forming apparatus 1 according to the embodiment of the present disclosure with reference to FIGS. 3, 4A, 4B, 5A, and 5B.

The color conversion rendering process of the present embodiment involves acquiring printing data 300, generating rendering data 330 by converting first color values 401 for each object included in the printing data 300 to second color values 402, and forming an image corresponding to the rendering data 330 on a recording sheet. In the present embodiment, the color conversion is performed by the K-monochrome interpolation calculator 131 using the K-monochrome color conversion table 310 when the distance ratio βq calculated by the coordinate ratio comparer 123 is greater than the ratio threshold value α. On the other hand, the color conversion is performed by the hue plane interpolation calculator 132 using the hue plane color conversion table 320 when the distance ratio βq is not greater than the ratio threshold value α.

In the color conversion rendering process of the present embodiment, the controller 10 controls operation of hardware resources of the image forming apparatus 1 through execution of the control program stored in the storage section 19.

Figure 3:
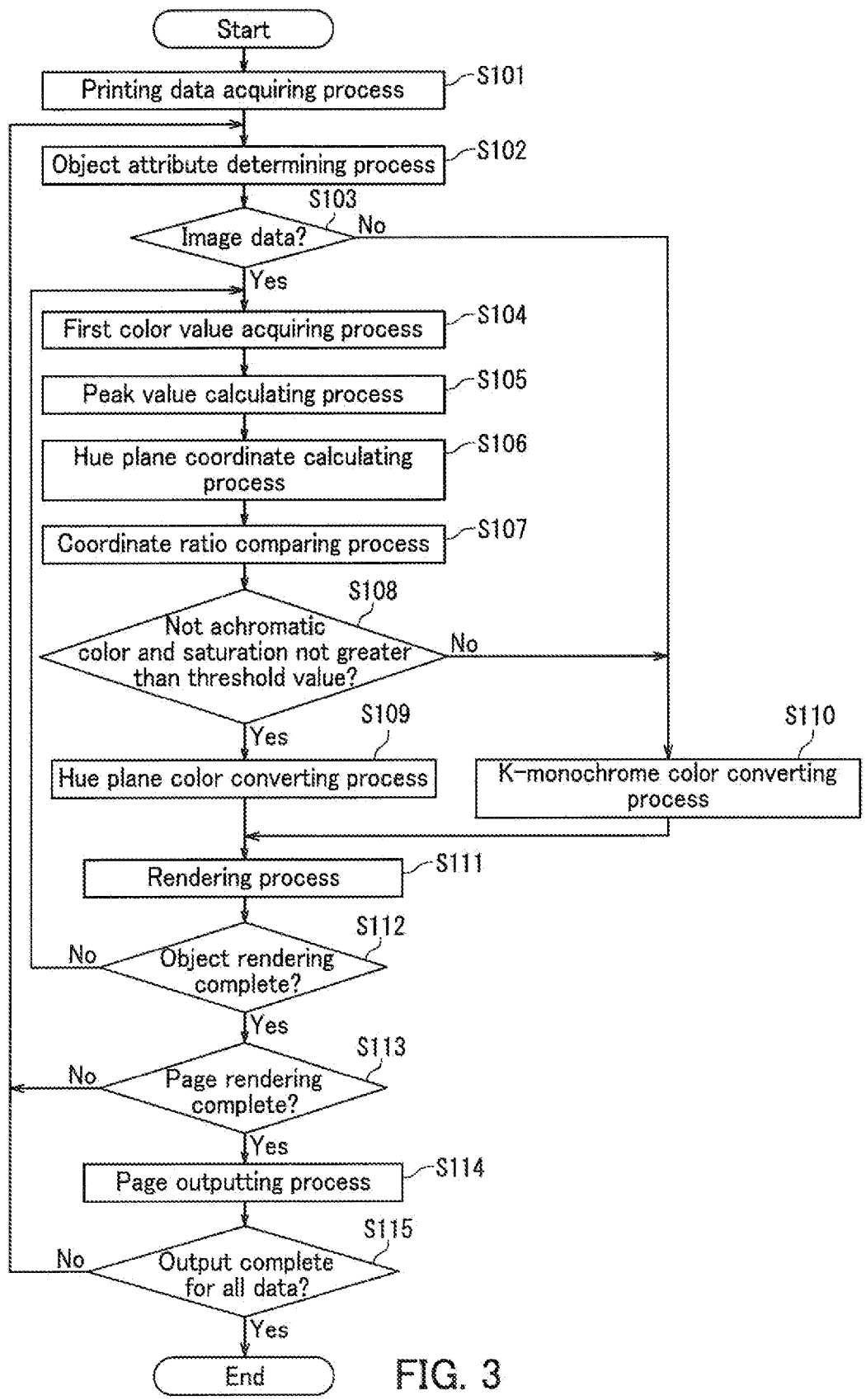
FIG. 3 illustrates a process for color conversion rendering according to an embodiment of the present disclosure.

The following provides a detailed step-by-step explanation of the color conversion rendering process with reference to the flowchart in FIG. 3.

(Step S101)
First, the printing data acquiring section 100 of the controller 10 performs a printing data acquiring process explained below.

The printing data acquiring section 100 acquires printing data 300 which is image data that has been read by the document scanning section 12. In such a situation, image data for each page is included in the printing data 300 as an object.

The printing data acquiring section 100 may alternatively acquire printing data 300 from the fax transmitting and receiving section 18 that has been received as a facsimile. In such a situation, image data of each page is included in the printing data 300 as an object.

The printing data acquiring section 100 may alternatively acquire printing data 300 that has been transmitted by another terminal or server and that has been received by the network transmitting and receiving section 15. In such a situation, character objects and image objects for each page may be included in the printing data 300.

The printing data acquiring section 100 may alternatively acquire printing data 300 from an externally connected storage medium. In such a situation, character objects and image objects for each page may be included in the printing data 300.

The printing data acquiring section 100 stores the printing data 300 acquired thereby in the storage section 19.
(Step S102)
Next, the attribute determining section 110 of the controller 10 performs an object attribute determining process explained below.

The attribute determining section 110 analyzes the printing data 300, selects and acquires an object included in the printing data 300, which is a single unit of printing, and determines an attribute of data of the object.

When the printing data 300 is in PDL format, the attribute determining section 110 may determine between data for image objects such as diagrams and data for other objects such as characters.

The attribute determining section 110 may also perform decoding and conversion of the object. For example, when the object is image data in JPEG format, the attribute determining section 110 may decode the JPEG format image data to bitmap image data that is actually used in rendering.
(Step S103)
Next, the attribute determining section 110 of the controller 10 judges whether or not an attribute of the object of the printing data 300 is an image attribute. When the attribute determining section 110 judges that the attribute of data of the selected object is an image attribute (Step S103: Yes), the attribute determining section 110 proceeds to Step S104 of the process. Data of an image object may include data other than bitmap format data, such as data of vector rendered graphs and diagrams. On the other hand, when the attribute determining section 110 judges that the attribute of the data of the selected object is an attribute such as a character attribute that is not an image attribute (Step S103: No), the attribute determining section 110 proceeds to Step S110 of the process.
(Step S104)
When the attribute of the data of the selected object is an image attribute (Step S103: Yes), the color position calculating section 120 of the controller 10 performs a first color value acquiring process explained below.

The color position calculating section 120 acquires a color value (RGB value) for each pixel configuring image data of the object included in the printing data 300 for which color conversion is required. Each of the acquired color values is a first color value 401.

(Step S105)

Next, the hue plane peak calculator 121 of the color position calculating section 120 of the controller 10 performs a peak value calculating process explained below.

Figure 4A:
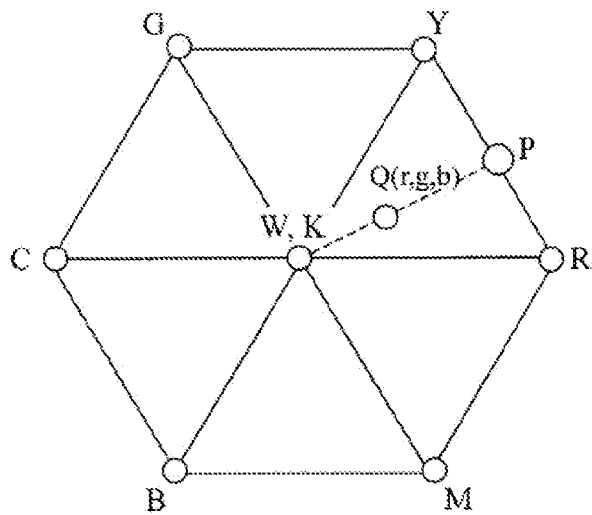
FIGS. 4A and 4B illustrate a general concept of a peak value calculating process in FIG. 3.

FIG. 4A is a plan view of the cube illustrated on the left-hand side of FIG. 2B in which the cube is orientated such that the achromatic axis connecting the point K, indicating black, and the point W, indicating white, is in a vertical direction. In FIG. 4A, position and chroma can be represented in R, M, B, C, Y, and G hues. For example, if coordinates expressed by gradation values of the R, G, and B axes in the RGB color space are denoted (r,g,b), a point Q (r,g,b) corresponding to a first color value 401 is located within a region defined by a hexagonal shape connecting the apices indicating the R, M, B, C, G, and Y colors. The hue plane peak calculator 121 calculates a hue plane of the point Q corresponding to the first color value 401 and calculates coordinates of a peak point P corresponding to a peak color value having a greatest chroma among all color values in the hue plane.

Figure 4B:
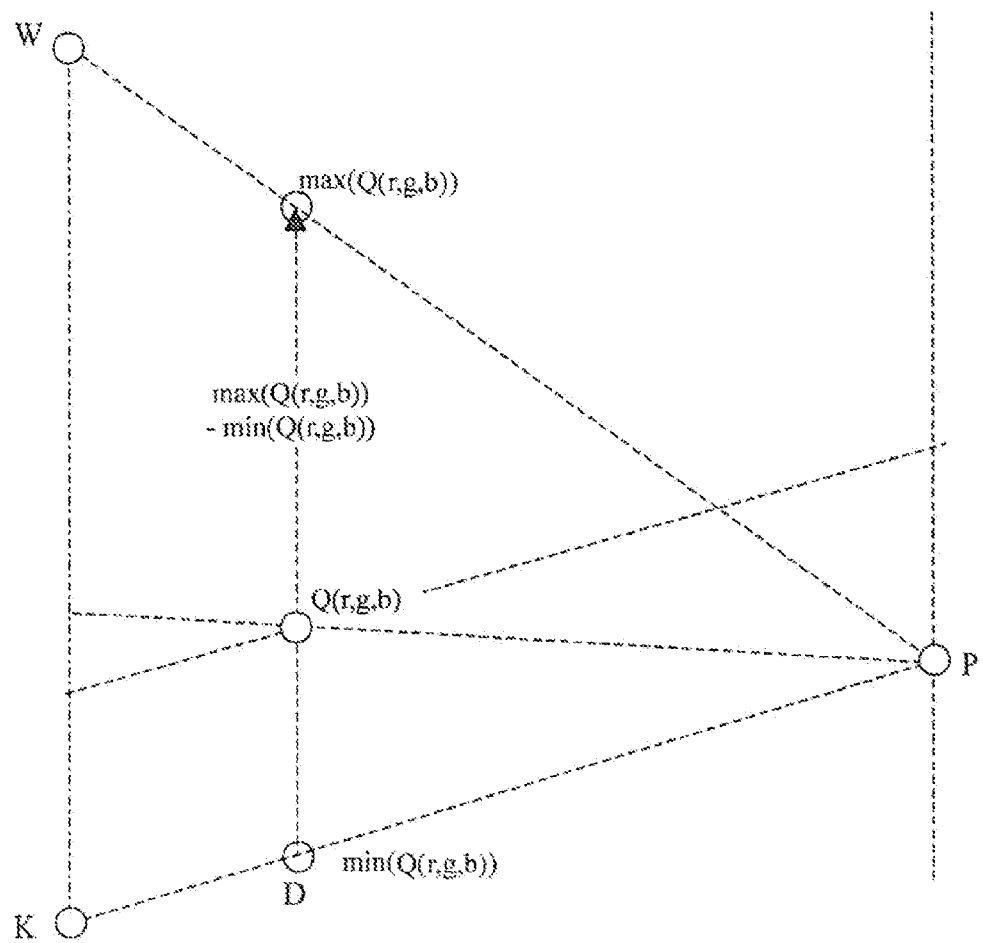

FIG. 4B illustrates calculation of the coordinates of the peak point P. The hue plane peak calculator 121 uses Formula (1) shown below to calculate the coordinates of the peak point P, corresponding to a position having a greatest chroma in the hue plane of the point Q.

$$\text{Peak point } P(r,g,b) = Q(r,g,b) \times |\max(Q(r,g,b)) - \min(Q(r,g,b))| / |Q(r,g,b) - \min(Q(r,g,b))| \quad (1)$$

In Formula (1), the term "min(Q(r,g,b))" refers to coordinates of a point in the same hue plane as the point Q, shown in brackets, that corresponds to a color having a smallest lightness among colors corresponding to the point Q. In Formula (1), the term "max(Q(r,g,b))" refers to coordinates of a point in the same hue plane as the point Q, shown in the brackets, that corresponds to a color having a greatest lightness among colors corresponding to the point Q. A term of the type |A−B| represents a distance between a point A and a point B.

(Step S106)

Next, the hue plane coordinate calculator 122 of the color position calculating section 120 of the controller 10 performs a hue plane coordinate calculating process explained below.

The hue plane coordinate calculator 122 calculates a distance ratio βq for the point Q corresponding to the first color value 401 based on a relationship between the point Q, the peak point P in the hue plane of the point Q, and the achromatic axis.

The hue plane coordinate calculator 122 calculates positional relationship between the point Q and the peak point P in the hue plane of the point Q, and uses Formula (2) shown below to calculate a distance ratio βq indicating a ratio of a distance between the point Q and the achromatic axis relative to a distance between the peak point P and the achromatic axis.

$$\beta q = |Q(r,g,b) - \min(Q(r,g,b))| / |\max(Q(r,g,b)) - \min(Q(r,g,b))| \quad (2)$$

(Step S107)

Next, the coordinate ratio comparer 123 of the color position calculating section 120 of the controller 10 performs a coordinate ratio comparing process explained below.

Figure 5A:
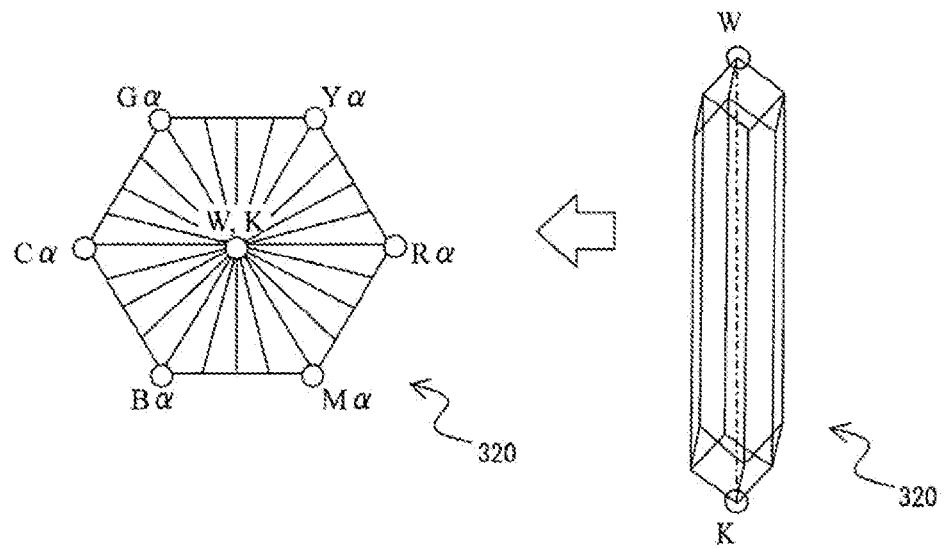
FIGS. 5A and 5B illustrate a general concept of a hue plane coordinate calculating process and a coordinate ratio comparing process.
Figure 5B:
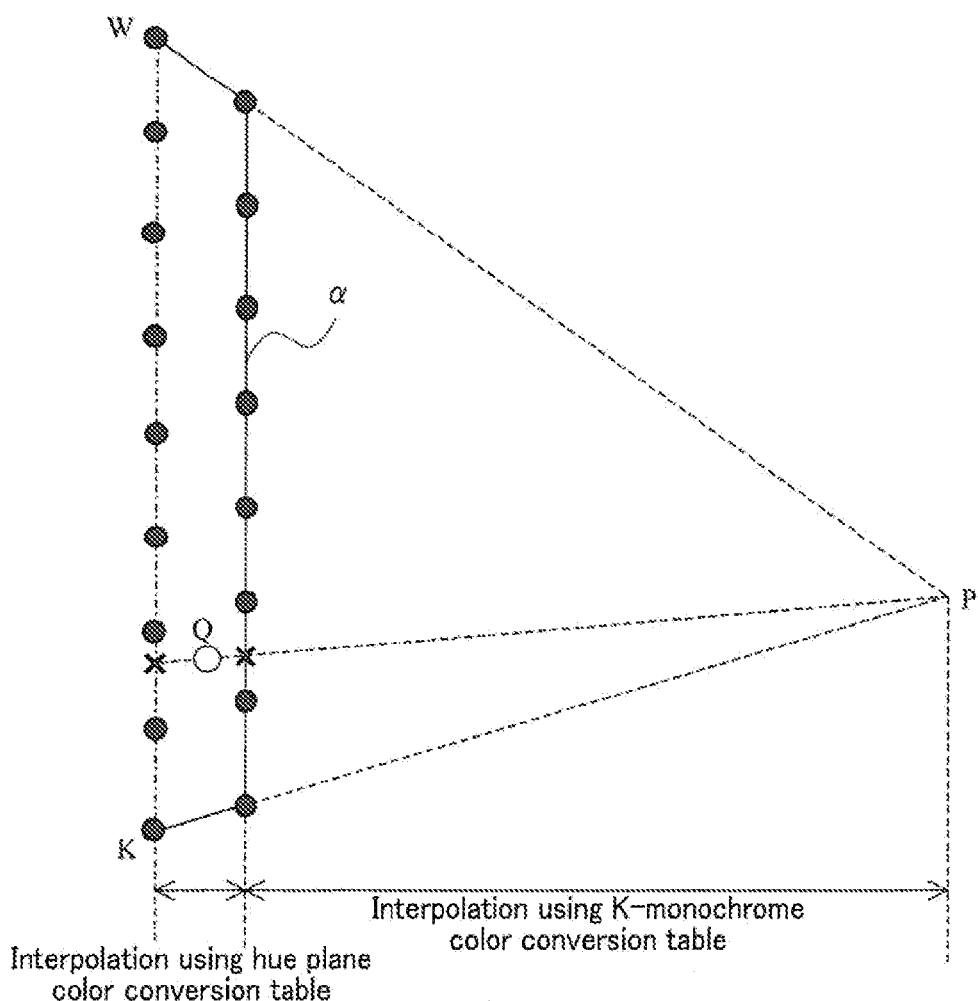

As illustrated in FIG. 5B, the coordinate ratio comparer 123 compares the distance ratio βq to a ratio threshold value α that is set based on a number N of lattice points in the RGB color space. Herein, the distance ratio βq for the point Q in the RGB color space represents a ratio of a distance between the point Q and the achromatic axis relative to a distance between the peak point P and the achromatic axis in the hue plane of the point Q.

The coordinate ratio comparer 123 uses Formula (3) shown below to set the ratio threshold value α based on the number N of lattice points in the RGB color space.

$$\text{Ratio threshold value } \alpha = 1/(N-1) \quad (3)$$

The coordinate ratio comparer 123 compares the distance ratio βq to the ratio threshold value α that is set using Formula (3).

In FIG. 5A, with the achromatic axis orientated vertically, lattice points Rα, Mα, Bα, Cα, Gα, and Yα in the R, M, B, C, G, and Y hue planes respectively are each separated from the achromatic axis by the same distance in the same way as the lattice points located one interval away from the achromatic axis for the K-monochrome color conversion table 310 (refer to FIGS. 2B and 2C). A region surrounded by the lattice points Rα, Mα, Bα, Cα, Gα, and Yα may be set as a region in the RGB color space for which the hue plane color conversion table 320 is applied. Through the above, color values in proximity to the achromatic axis can be interpolated using a distance between the lattice in proximity to the achromatic axis and the achromatic axis.

In other words, the hue plane color conversion table 320 is used when performing interpolation for color values in proximity to the achromatic axis of the RGB color space. Also, as illustrated in FIG. 5A, the RGB color space may be partitioned into a specified number of RMBCGY hue planes and conversion values for converting to CMYK colors may be set in the hue plane color conversion table 320 for each of the hue planes. FIG. 5A illustrates an example in which the number M of partitioning hue planes for the hue plane color conversion table 320 is 24. In a configuration in which the number M of partitioning hue planes is 48, conversion values for conversion to CMYK colors can be set more appropriately.

(Step S108)

Next, the coordinate ratio comparer 123 of the color position calculating section 120 of the controller 10 judges whether a chroma of the first color value 401 is not greater than the ratio threshold value α and also does not indicate an achromatic color. When the coordinate ratio comparer 123 judges that the distance ratio βq is not greater than the threshold value α and is not equal to zero (Step S108: Yes), the coordinate ratio comparer 123 proceeds to Step S109 of the process. In all other situations, which in other words is when the coordinate ratio comparer 123 judges that the distance ratio βq is greater than the ratio threshold value α or that the distance ratio βq is equal to zero (Step S108: No), the coordinate ratio comparer 123 proceeds to Step S110 of the process. The coordinate ratio comparer 123 may alternatively judge that the first color value 401 corresponds to an achromatic color when values for the R, G and B colors indicated by the first color value 401 are all approximately equal.

(Step S109)

When the distance ratio βq (chroma) is not greater than the ratio threshold value α and is not equal to zero (Step S108: Yes), the hue plane interpolation calculator 132 of the color value converting section 130 of the controller 10 performs a hue plane color converting process explained below.

As illustrated in FIG. 5B, when the point Q corresponding to the first color value 401 in the RGB color space is in proximity to the achromatic axis, the hue plane interpolation calculator 132 calculates a second color value 402 by performing interpolation calculation using the hue plane color conversion table 320 which uses the RMBCGY hue planes. Thus, when the distance ratio βq for the point Q is not greater than the ratio threshold value α, indicating that the point Q is included in a region in proximity to the achromatic axis, the hue plane interpolation calculator 132 calculates the second color value 402 by performing interpolation calculation using the hue plane color conversion table 320 that is finely partitioned for each hue plane.

In the interpolation calculation, when the point Q(r,g,b) corresponding to the first color value 401 is not a point on one of the RMBCGY hue planes (refer to FIG. 4A), the hue plane interpolation calculator 132 may perform linear interpolation between two adjacent hue planes among the RMBCGY hue planes using conversion values stored in the hue plane color conversion table 320. Note that alternatively a conversion value to a CMYK color may be set in the hue plane interpolation calculator 132 for every point in the color space corresponding to a first color value 401 for which the distance ratio $\beta q$ is not greater than the ratio threshold value $\alpha$.

The hue plane interpolation calculator 132 subsequently proceeds to Step S111 of the process.

(Step S110)

When the distance ratio $\beta q$ for the first color value 401 is greater than the ratio threshold value $\alpha$ or the first color value 401 corresponds to an achromatic color (Step S108: No), or the attribute of the object of the printing data 300 is not an image attribute (Step S103: No), the K-monochrome interpolation calculator 131 of the color value converting section 130 of the controller 10 calculates a second color value 402 by performing a K-monochrome color converting process explained below.

The K-monochrome interpolation calculator 131 converts the first color value 401 to the second color value 402 using the K-monochrome color conversion table 310, which is a standard color conversion table, when the first color value 401 corresponds to a point located in a region that is not in proximity to the achromatic axis. In other words, when the distance ratio $\beta q$ for the point Q corresponding to the first color value 401 is greater than the ratio threshold value $\alpha$, the first color value 401 is converted to the second color value 402 by performing linear interpolation using the K-monochrome color conversion table 310 which is partitioned for a plurality of lattice points.

Also, even when the distance ratio $\beta q$ is not greater than the ratio threshold value $\alpha$, if the distance ratio $\beta q$ is equal to zero, indicating that the point Q corresponds to an achromatic color, the K-monochrome interpolation calculator 131 calculates the second color value 402 by performing linear interpolation using conversion values in the K-monochrome color conversion table 310 corresponding to lattice points on the achromatic axis in order that achromatic colors are converted to K-monochromatic colors. Note that in such a situation, the K-monochrome interpolation calculator 131 may alternatively calculate the second color value 402 by performing interpolation calculation using a color conversion table that is only used for conversion of achromatic colors.

The K-monochrome interpolation calculator 131 also calculates the second color value 402 by performing linear interpolation using the K-monochrome color conversion table 310 when the attribute of the object of the printing data 300 is not an image attribute.

(Step S111)

In Step S111, the color value converting section 130 of the controller 10 performs a rendering process explained below.

The color value converting section 130 renders the object of the printing data 300 using the second color values 402 acquired through conversion of the first color values 401, and thereby generates rendering data 330.

(Step S112)

Next, the color value converting section 130 of the controller 10 judges whether or not rendering of the object is complete. When the color value converting section 130 judges that rendering of the object is complete (Step S112: Yes), the color value converting section 130 proceeds to Step S113 of the process. When the color value converting section 130 judges that rendering of the object is not complete (Step S112: No), the color value converting section 130 returns to Step S104 of the process and continues color conversion for first color values 401 in the object that it is necessary to convert to second color values 402.

(Step S113)

Next, the color value converting section 130 of the controller 10 judges whether or not rendering of a page is complete. When the color value converting section 130 judges that rendering is complete for all objects in a page of the printing data 300 (Step S113: Yes), the color value converting section 130 proceeds to Step S114 of the process. When the color value converting section 130 judges that rendering is not complete for all objects in a page of the printing data 300 (Step S113: No), the color value converting section 130 returns to Step S102, and continues rendering for a different object of the printing data 300.

(Step S114)

In Step S114, the controller 10 performs a page outputting process.

The controller 10 causes the image former 17 to print an image on a recording sheet corresponding to the rendering data 330. Through the above process, a page for which first color values 401 of the printing data 300 have been converted to second color values 402 is printed on the recording sheet.

Note that the controller 10 may alternatively output the generated rendering data 330 through creation of a PDF or PS (PostScript) file, storage on an external storage medium, transmission of a file to an external terminal or server, or transmission of a facsimile.

(Step S115)

Next, the controller 10 judges whether or not output is complete for all data. When the controller 10 judges that output is complete for all pages included in the printing data 300 (Step S115: Yes), the controller 10 ends the process. When the controller 10 judges that output is not complete for all pages included in the printing data 300 (Step S115: No), the controller returns to Step S102 of the color conversion rendering process, and performs rendering of an object for a next page included in the printing data 300.

The above ends the color conversion rendering process according to the embodiment of the present disclosure.

The following effects can be achieved through the configuration described above.

In the image forming apparatus 1, a color converting device for converting a first color value 401 acquired from printing data to a second color value 402 includes the color value converting section 130. The color value converting section 130 converts the first color value 401 to the second color value 402 using the K-monochrome color conversion table 310 in which achromatic colors are set as monochromatic colors when the first color value 401 satisfies a preset condition. The color value converting section 130 converts the first color value 401 to the second color value 402 using the hue plane color conversion table 320 in which achromatic colors are set as mixed colors of a plurality of colors when the first color value 401 does not satisfy the preset condition.

Through the configuration described above, the image forming apparatus 1 can perform color conversion with a high degree of accuracy in proximity to achromatic colors, without the need to perform a complicated process such as spline conversion, by splitting a color conversion table into two different tables (the K-monochrome color conversion table 310 and the hue plane color conversion table 320). As a result of the above it is not necessary for the controller 10 which performs color conversion to have a high processing ability, and thus costs can be reduced.

The image forming apparatus 1 further includes the color position calculating section 120 that calculates a hue plane and a chroma of the first color value 401. The color value converting section 130 converts the first color value 401 to the second color value 402 using the K-monochrome color conversion table 310 in which achromatic colors are set as monochromatic colors when the chroma calculated by the color position calculating section 120 is greater than a preset chroma threshold value γ. The color value converting section 130 converts the first color value 401 to the second color value 402 using the hue plane color conversion table 320 in which achromatic colors are set as mixed colors of a plurality of colors when the chroma calculated by the color position calculating section 120 is not greater than the preset chroma threshold value γ.

Through the configuration described above, two color conversion tables (the K-monochrome color conversion table 310 and the hue plane color conversion table 320) can be appropriately switched between through a simple configuration, thereby enabling accurate reproduction of colors in proximity to achromatic colors and improvement in visual quality of printed matter.

In the image forming apparatus 1, the chroma threshold value γ is set based on the hue of the first color value 401.

Through the configuration described above, the chroma threshold value γ can be set as an appropriate value, thereby enabling more appropriate switching between the two color conversion tables (the K-monochrome color conversion table 310 and the hue plane color conversion table 320). Therefore, the above configuration enables more accurate reproduction of colors in proximity to achromatic colors and further improvement in visual quality of printed matter.

In the image forming apparatus 1, the first color value 401 is a color value in an RGB color space and the second color value 402 is a color value in a CMYK color space. In the K-monochrome color conversion table 310, a conversion value for conversion to the CMYK color space is set for each of plurality of lattice points set at specified intervals in the RGB color space, and for each of the lattice points that corresponds to an achromatic color, the conversion value for the lattice point is set to a K-monochromatic color. In the hue plane color conversion table 320, a conversion value for converting to the CYMK color space is set for each of a plurality of lattice points set at specified intervals, finer than the intervals for the K-monochrome color conversion table 310, in hue planes partitioning the RGB color space at specified intervals, and for each of the lattice points that corresponds to an achromatic color, the conversion value for the lattice point is set to a mixed colors of C, M, Y, and K colors.

Through the configuration described above, the image forming apparatus 1 can perform conversion based on coordinates of input data in the RGB color space when using the color conversion tables to perform color conversion from the RGB color space to the CMYK color space. Therefore, the first color value 401, which is expressed in the RGB color space, can be converted to the CMYK color space without conversion to a CIE (Commission Internationale de l'Eclairage) hue, enabling improved color conversion accuracy.

In order to increase accuracy for colors in proximity to achromatic colors, the image forming apparatus 1 uses the hue plane color conversion table 320 which is a detailed color conversion table along hue planes. Supposing that the RGB color space is partitioned into M hue planes, N pieces of achromatic color data are required and N−1 pieces of lattice data in proximity to achromatic colors are required for each of the hue planes. Therefore, the hue plane color conversion table 320 is required to store (N+(N−1)×M)×4 pieces of data therein. It is necessary to form K-monochrome achromatic colors to match an attribute of data for which color conversion is to be performed, and thus alternatively a one-dimensional color conversion table for N K-monochromatic colors may be prepared (number of pieces of data=N×4 colors). In the hue plane color conversion table 320, achromatic color data is formed by CMYK mixed colors.

In other words, in the image forming apparatus 1, the number of pieces of data in the color conversion table can be reduced to 4×(N^3+N(2+M)−M). Accurate color conversion can be performed even in the above situation. Note that N^3 denotes N to the power of three.

The color position calculating section 120 of the image forming apparatus 1 includes the hue plane peak calculator 121, the hue plane coordinate calculator 122, and the coordinate ratio comparer 123. The hue plane peak calculator 121 calculates coordinates of a peak point P which is a position having a greatest chroma in a hue plane including a first color value 401 in the hue plane color conversion table 320. The hue plane coordinate calculator 122 calculates a positional relationship between the first color value 401 and the coordinates of the peak point P calculated by the hue plane peak calculator 121, and calculates a distance ratio βq of a distance between a point Q corresponding to the first color value 401 and an achromatic axis relative to a distance between the peak point P and the achromatic axis. The coordinate ratio comparer 123 performs a comparison of the distance ratio βq calculated by the hue plane coordinate calculator 122 and a ratio threshold value α set based on a number N of lattice points in the RGB color space. The color value converting section 130 includes the K-monochrome interpolation calculator 131 and the hue plane interpolation calculator 132. The K-monochrome interpolation calculator 131 performs interpolation calculation to convert the first color value 401 to a second color value 402 using the K-monochrome color conversion table 310 when the coordinate ratio comparer 123 determines that the distance ratio βq is greater than the ratio threshold value α during the comparison. The hue plane interpolation calculator 132 performs interpolation calculation to convert the first color value 401 to the second color value 402 using the hue plane color conversion table 320 when the coordinate ratio comparer 123 determines that the distance ratio βq is not greater than the ratio threshold value α during the comparison.

Through the configuration described above, the image forming apparatus 1 can simply switch between the K-monochrome color conversion table 310 and the hue plane color conversion table 320 as appropriate through use of the ratio threshold value α. Therefore, the image forming apparatus 1 enables accurate reproduction of colors in proximity to achromatic colors and improvement in visual quality of printed matter. Different color conversion tables can be used discriminately even for conversion of colors of 8 bits or more.

Discriminated use of two different color conversion tables enables a color converting process to be performed without complicated calculations or storage of excessively large amounts of data.

Also, in the image forming apparatus 1, the ratio threshold value α may for example be set based on the number of lattice points in the RGB color space as shown in Formula (3).

The above configuration enables simple and appropriate setting of the ratio threshold value α.

In the image forming apparatus 1, the attribute determining section 110 determines attributes of data included in the printing data 300. The color value converting section 130 uses the K-monochrome color conversion table 310 for color conversion when the attribute determining section 110 determines that an attribute of an object is not an image attribute.

Through the configuration described above, the image forming apparatus 1 can treat achromatic colors as K-monochromatic colors during reproduction of an object that for example has a character attribute. As a consequence of the above it is not necessary to print characters using color toner, leading to beneficial effects of reduced amount of toner usage, shortened printing time, and cost reduction.

Example and Comparative Example

Color Conversion Table Generation

Figure 6A:
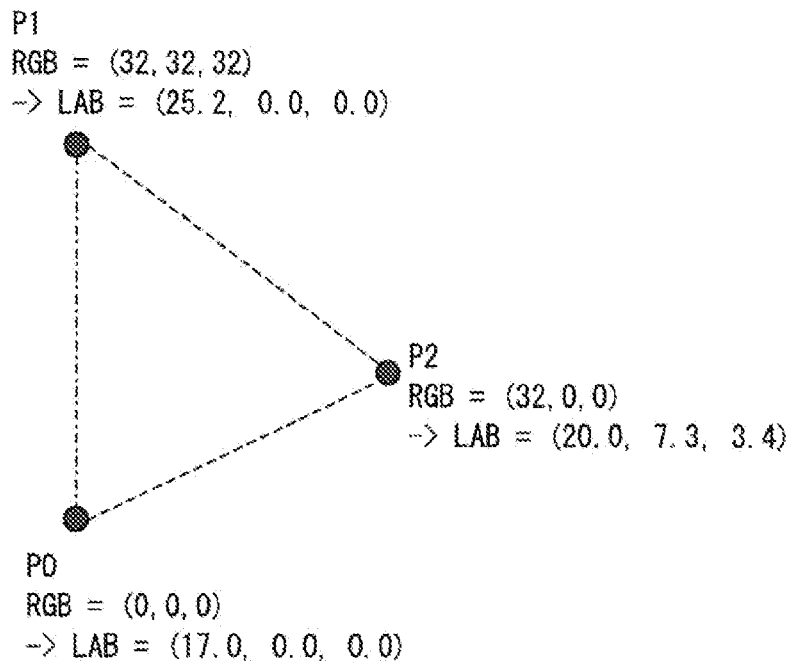
FIGS. 6A and 6B illustrate a method for generating a K-monochrome color conversion table and a hue plane color conversion table according to an embodiment of the present disclosure.
Figure 6B:
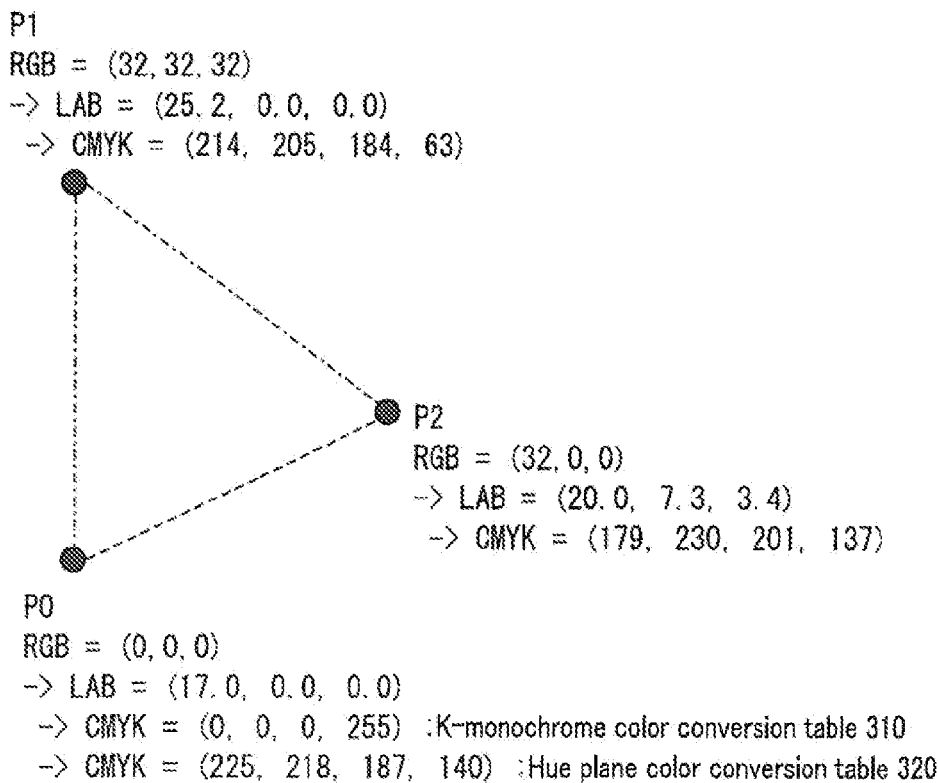

The K-monochrome color conversion table 310 and the hue plane color conversion table 320 are used in a comparative example and an example explained below with reference to FIGS. 7A, 7B, 8A, and 8B. FIGS. 6A and 6B illustrate an example of generation of the K-monochrome color conversion table 310 and the hue plane color conversion table 320. FIGS. 6A and 6B illustrate an example of what type of color values (CIE Lab) a portion of lattice points are in a dark region (low lightness and low chroma region) of a hue plane having a peak of red (R,G,B)=(255,0,0) when the lattice number in an axial direction is 9 (i.e., 9 lattice points are present along each of the R, G, and B axes).

FIG. 6A illustrates a color value (L,a,b) in a Lab color space corresponding to a first color value 401 in the RGB color space for lattice points P1, P2, and P0 in proximity to black in a red hue plane.

FIG. 6B illustrates an example in which color values in the CMKY color space corresponding to the Lab values are calculated for the lattice points P1, P2, and P0, and are set in the K-monochrome color conversion table 310 and the hue plane color conversion table 320. Note that in the above situation, an achromatic color is set as a K-monochromatic color in the K-monochrome color conversion table 310, whereas the achromatic color is set as a CMYK color space mixed color in the hue plane color conversion table 320. In the present example, CMYK color space mixed colors are not set in the hue plane color conversion table 320 for each of the hue planes, other than for the lattice points.

Comparative Example

FIG. 7A illustrates a comparative example in which color conversion for a color value located along a line between two adjacent lattice points is performed through linear interpolation based on values set for the lattice points in the K-monochrome color conversion table 310. FIG. 7A shows first color values 401 (input), second color values 402 (interpolated values) after color conversion, and measured values for the second color values 402 measured in a Lab color space, in a configuration where only a color conversion table in which achromatic colors are set as K-monochromatic colors is generated. Note that color values for the points P0 and P2 shown in FIG. 6A are marked by an asterisk * in FIG. 7A.

Figure 7B:
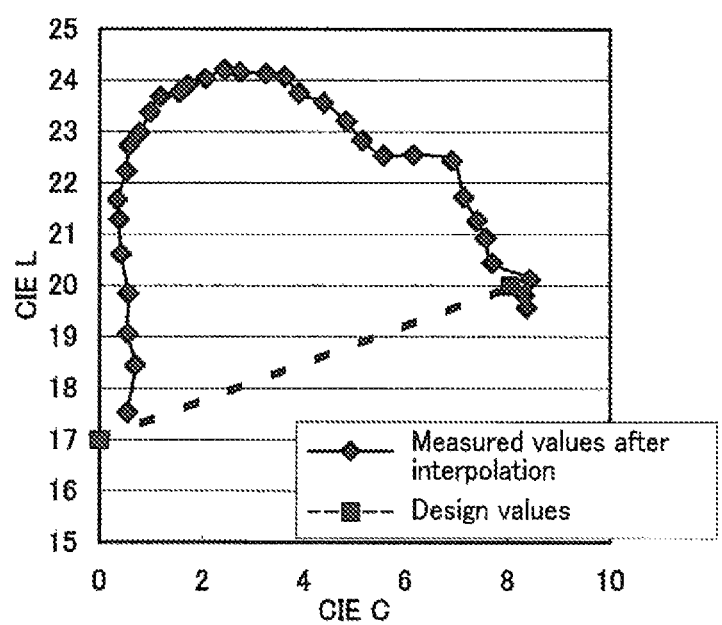

FIG. 7B is a graph of Lab values acquired through CIE Lab measurement of the interpolated values shown in FIG. 7A, plotted against a CIE C (Chroma) axis and a CIE L axis. The straight line of design values shown in the graph indicates design values that should be calculated for the second color values 402 (i.e., ideal values). However, when actual color measurement is performed, the interpolated values (measured values of colors after interpolation), calculated through linear interpolation between lattice points, deviate greatly from the design values. In other words, actual measurement with respect to the second color values 402 (CMYK color space color values) shows that appropriate interpolation of the lattice is not possible.

Example

FIG. 8A illustrates an example in which color conversion for a color value located along a line between two adjacent lattice points is performed through linear interpolation using the hue plane color conversion table 320 which is generated by setting achromatic colors as CMYK mixed colors instead of as K-monochromatic colors. FIG. 8A shows first color values 401 (input), second color values 402 (interpolated values), and measured values for the second color values 402 in the Lab color space. Note that color values for the points P0 and P2 shown in FIG. 6A are marked by an asterisk * in FIG. 8A.

Figure 8B:
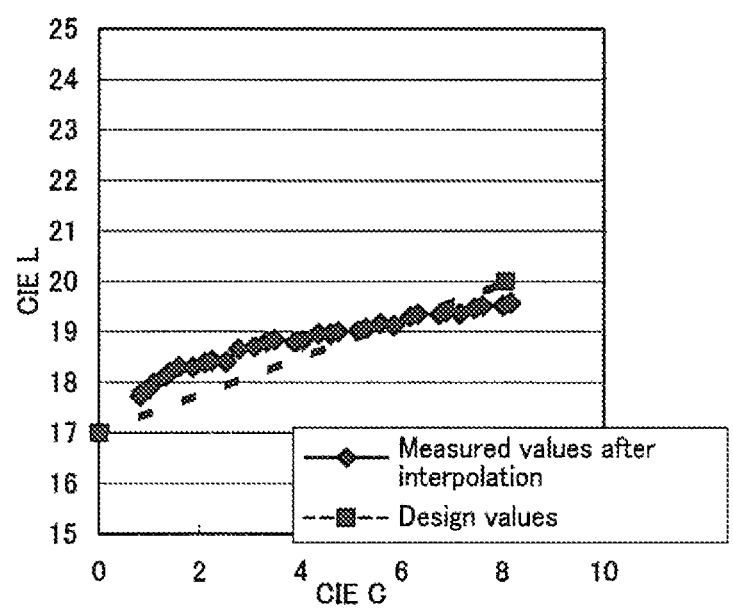

FIG. 8B is a graph of Lab values of the measured values in FIG. 8A, plotted against a CIE C axis and a CIE L axis. The design values in the graph and the values of the axes in the graph are the same as in FIG. 7B. When interpolation between lattice points is performed using the hue plane color conversion table 320, the resultant second color values (interpolated values) show little deviation from the design values. When color values that are actually output are measured, even color values that are obtained through interpolation show little deviation from the design values (ideal values). In other words, a linear shape close to an ideal shape can be maintained for CMYK color values resulting from linear interpolation for colors values located on a line between two adjacent lattice points and CIE Lab values which are measured with respect to the aforementioned color values.

Thus, as a result of the hue plane color conversion table 320 in which achromatic colors are set as CMYK mixed colors being used during linear interpolation in the present example, color conversion can be performed to color values that closely match design values (ideal values). As explained for the above embodiment, color conversion can be performed with a high degree of accuracy as a result of lattice points being set at intervals in the partitioning hue planes of the hue plane color conversion table 320 that are finer than the intervals for the K-monochrome color conversion table 310.

Other Embodiments

The present disclosure is also applicable in a color converting device other than an image forming apparatus. For example, an alternative configuration may use a network scanner and a server connected to the scanner through a USB.

The color converting device is also applicable in a general purpose computer for color conversion of video images and an apparatus for displaying colors on a display.

In the embodiment described above, explanation is given using the RGB color space and the CMYK color space as examples of color spaces, but alternatively different color spaces may be used. For example, alternatively color conversion may be performed to a color space in which a color other than the C, M, Y, and K colors is added.

In such a configuration, color control can be performed in consideration of a person's sense of sight, which is sensitive to colors in proximity to achromatic colors.

Alternatively a flag image for determining whether or not each point of a bitmap image of the rendering data 330 is for an object other than an image object may be used. In such a configuration, the color value converting section 130 of the image forming apparatus 1 writes an attribute of each object of the printing data 300 in the flag image when rendering the object. After rendering in the RGB color space, the attribute determining section 110 determines an attribute of each point in the rendering data 330 and performs color conversion.

Such a configuration enables shortening of the amount of time required for color conversion with respect to data for characters superimposed on an image such as a diagram.

The attribute determining section 110 may alternatively perform color conversion using the hue plane color conversion table 320 for all objects of the printing data 300 that are not characters.

Through the above, the hue plane color conversion table 320 can also be used for color conversion with respect to an object that is not an image, such as a decorative character or a graph.

Also, with regards to each object of the printing data 300, when the object contains only a small number of colors, conversion may be performed for each color of the object which is a conversion target, and results of the conversion may be stored as a data cache in the storage section 19.

Through the configuration described above, processing speed can be improved as it is not necessary to perform color conversion for an object of image data including a drawing formed from only a small number of colors.

With regards to character objects that are not images, conversion may be performed using the hue plane color conversion table 320 for colors other than achromatic colors.

The configuration described above enables reduced color toner consumption and increased printing speed due to achromatic color characters being printed as monochromatic black. The aforementioned configuration also enables printing of colors that more closely match design values for characters that are not achromatic colors.

In the embodiment described above, the ratio threshold value α is set based on a partition number of the K-monochrome color conversion table 310. However, the above is not a limitation and alternatively the ratio threshold value α may be set based on design values for color expression of the image forming apparatus 1 or measured values for human color recognition.

In such a configuration, interpolation may be performed using both the K-monochrome color conversion table 310 and the hue plane color conversion table 320 for a boundary plane between lattice points.

Also, in order to determine whether a first color value 401 is a color value in proximity to achromatic colors for which the ratio threshold value α is not exceeded, an absolute value of color difference between each of the colors of the first color value 401 may be calculated and it may be determined whether the absolute value does not exceed a preset threshold value. An average value or a variance may alternatively be calculated instead of the absolute value. For example, the first color value 401 may be determined to be included in a region in proximity to achromatic colors when an absolute value of color difference between R, G, and B components of the point Q corresponding to the first color value 401 is not greater than a preset threshold value.

The configuration and operation of the embodiment described above is merely an example and appropriate variations are of course possible so long as such variations do not deviate from the intended scope of the present disclosure.

What is claimed is:

1. A color converting device for converting a first color value acquired from printing data to a second color value, the color converting device comprising:
   a storage unit for storing the color values; and
   a color value converting section that converts the first color value to the second color value using a first color conversion table in which achromatic colors are set as monochromatic colors when the first color value satisfies a preset condition, and that converts the first color value to the second color value using a second color conversion table in which the achromatic colors are set as mixed colors of a plurality of colors when the first color value does not satisfy the preset condition, wherein
   the first color value is a color value in an RGB color space and the second color value is a color value in a CMYK color space,
   in the first color conversion table, a conversion value for converting to the CMYK color space is stored for each of a plurality of lattice points set at first intervals in the RGB color space, and for each of the lattice points that corresponds to an achromatic color, the conversion value stored for the lattice point is for conversion to a K-monochromatic color, and
   in the second color conversion table, a conversion value to the CYMK color space is stored for each of a plurality of lattice points set at second intervals, finer than the first intervals, in a plurality of hue planes partitioning the RGB color space at preset intervals, and for each of the lattice points that corresponds to an achromatic color, the conversion value stored for the lattice point is for conversion to a mixed CMYK color.

2. A color converting device according to claim 1, further comprising
   a calculating section that calculates a hue plane and a chroma of the first color value, wherein
   the preset condition is that the chroma calculated by the calculating section is greater than a preset chroma threshold value.

3. A color converting device according to claim 2, wherein the chroma threshold value is set based on a hue of the first color value.

4. A color converting device according to claim 1, wherein the color converting device, when rendering printing data acquired thereby, converts a first color value acquired from the printing data to a second color value and forms an image.

5. A color converting method implemented by a color converting device for converting a first color value acquired from printing data to a second color value, the color converting method comprising:
   converting the first color value to the second color value using a first color conversion table in which achromatic colors are set as monochromatic colors when the first color value satisfies a preset condition; and
   converting the first color value to the second color value using a second color conversion table in which the achromatic colors are set as mixed colors of a plurality of colors when the first color value does not satisfy the preset condition, wherein
   the first color value is a color value in an RGB color space and the second color value is a color value in a CMYK color space,
   in the first color conversion table, a conversion value for converting to the CMYK color space is stored for each of a plurality of lattice points set at first intervals in the RGB color space, and for each of the lattice points that corresponds to an achromatic color, the conversion value stored for the lattice point is for conversion to a K-monochromatic color, and
   in the second color conversion table, a conversion value to the CYMK color space is stored for each of a plurality of lattice points set at second intervals, finer than the first intervals, in a plurality of hue planes partitioning the RGB color space at preset intervals, and for each of the lattice points that corresponds to an achromatic color, the conversion value stored for the lattice point is for conversion to a mixed CMYK color.

6. A color converting device for converting a first color value acquired from printing data to a second color value, the color converting device comprising:

a storage unit for storing the color values;

a color value converting section that converts the first color value to the second color value using a first color conversion table in which achromatic colors are set as monochromatic colors when the first color value satisfies a preset condition, and that converts the first color value to the second color value using a second color conversion table in which the achromatic colors are set as mixed colors of a plurality of colors when the first color value does not satisfy the preset condition;

a hue plane peak calculator that calculates a peak color value that has a greatest chroma among color values in a hue plane that includes the first color value and that is a hue plane in an RGB color space used to set conversion values in the second color conversion table;

a hue plane coordinate calculator that calculates a ratio of a chroma difference between the first color value and an achromatic color relative to a chroma difference between the peak color value and the achromatic color; and a coordinate ratio comparer that compares the ratio calculated by the hue plane coordinate calculator to a preset ratio threshold value, wherein the preset condition is that the coordinate ratio comparer judges that the ratio for the first color value is greater than the ratio threshold value, and the color value converting section includes:

a first interpolation calculator that converts the first color value to the second color value by performing interpolation calculation using the first color conversion table when the first color value satisfies the preset condition; and a second interpolation calculator that converts the first color value to the second color value by performing interpolation calculation using the second color conversion table when the first color value does not satisfy the preset condition.

7. A color converting device according to claim 6, wherein the coordinate ratio comparer sets the ratio threshold value based on a number of lattice points in a color space including the first color value.

8. A color converting device according to claim 6, wherein the color converting device, when rendering printing data acquired thereby, converts a first color value acquired from the printing data to a second color value and forms an image.

9. A color converting device according to claim 7, wherein the color converting device, when rendering printing data acquired thereby, converts a first color value acquired from the printing data to a second color value and forms an image.

* * * * *